United States Patent
Mehta et al.

(10) Patent No.: US 9,404,247 B2
(45) Date of Patent: *Aug. 2, 2016

(54) MANUAL TOILET FLUSHING APPARATUS WITH AN ODOR REDUCING FRESH WATER INLET VALVE ASSEMBLY

(71) Applicants: Vinod K Mehta, Pittsgrove, NJ (US); Michael W Sibley, Millville, NJ (US)

(72) Inventors: Vinod K Mehta, Pittsgrove, NJ (US); Michael W Sibley, Millville, NJ (US)

(73) Assignee: RARITAN ENGINEERING COMPANY, INC., Millville, NJ (US)

(*) Notice: Subject to any disclaimer, the term of this patent is extended or adjusted under 35 U.S.C. 154(b) by 353 days.

This patent is subject to a terminal disclaimer.

(21) Appl. No.: 14/179,552

(22) Filed: Feb. 12, 2014

(65) Prior Publication Data

US 2015/0225936 A1 Aug. 13, 2015

(51) Int. Cl.
  *E03D 5/01* (2006.01)
  *B60R 15/04* (2006.01)
  *E03D 11/00* (2006.01)

(52) U.S. Cl.
  CPC . *E03D 5/01* (2013.01); *B60R 15/04* (2013.01); *E03D 11/00* (2013.01)

(58) Field of Classification Search
  CPC ........... E03D 5/01; E03D 11/00; E03D 11/11; B60R 15/04; B61D 35/007
  USPC ..................................... 4/321, 354, 433, 449
  See application file for complete search history.

(56) References Cited

U.S. PATENT DOCUMENTS

| 1,403,688 | A | * | 1/1922 | Hunter | B63B 29/00 4/433 |
| 3,514,231 | A | * | 5/1970 | Belden | E03D 5/01 4/354 |
| 5,232,010 | A | | 8/1993 | Rozenblatt et al. | |
| 6,081,939 | A | * | 7/2000 | Dainelli | E03D 11/10 4/449 |
| 7,996,929 | B2 | | 8/2011 | Good et al. | |

* cited by examiner

*Primary Examiner* — Tuan N Nguyen
(74) *Attorney, Agent, or Firm* — Ash Tankha; Lipton, Weinberger & Husick

(57) ABSTRACT

A manual toilet flushing apparatus including an integral inlet fresh water valve assembly (IIFWVA) and a waste water discharge pump assembly (WWDPA) operably isolated from the IIFWVA is provided to preclude waste water from contaminating pressurized fresh water (PFW). The IIFWVA includes a pressurized fresh water inlet port to receive the PFW, an inlet valve body defining an inlet valve cavity (IVC), a second plunger in communication with a first plunger to actuate a check valve to direct a flow of the PFW into the IVC, and an outlet port. The PFW flows through the outlet port to a rim of a toilet bowl. The WWDPA includes a waste water inlet port to receive waste water, a discharge pump body, and a connecting rod in communication with a retractable handle to actuate a piston in backward and forward directions to suction and discharge the waste water through a discharge port.

27 Claims, 21 Drawing Sheets

MANUAL TOILET FLUSHING APPARATUS WITH AN ODOR REDUCING FRESH WATER INLET VALVE ASSEMBLY

BACKGROUND

Most toilets manufactured for vehicles, for example, boats, recreational vehicles, caravans, buses, etc., are either electric powered, non-electric, or manually operated. Non-electric toilets are either portable or permanently installed. Manual toilets currently bring water from the sea or lakes as raw water. Raw water from the sea or lakes is a major source of odors in and around a rim of a toilet bowl. For example, when a toilet is not used for an extended period of time, organic matter in the raw water in the toilet bowl starts to decompose and produce foul odors. Sea water is also a source of scale formation and clogs in the hose and plumbing of toilet related fixtures, and results in an increased requirement for maintenance of such fixtures. Flushing toilet with pressurized fresh water eliminates odors and scale formation. Most manual toilets currently in the market have an inlet section and a discharge pump as part of a single pump due to which transferring pressurized fresh water to the inlet section of the pump risks contamination of the inlet section of the pump by waste water discharged from the pump. Although fresh water can be added to the toilet bowl directly using a spray nozzle, there is a need for an integral system comprising an integral, manually operated fresh water inlet valve assembly and a waste water discharge pump assembly independent of the inlet valve assembly that flushes fresh water through the rim of the toilet bowl from a pressurized source.

Hence, there is a long felt but unresolved need for a flushing apparatus comprising an integral, manually operated pressurized fresh water inlet valve assembly and a waste water discharge pump assembly that is operably isolated from the integral inlet valve assembly for precluding waste water discharged from the toilet bowl via the waste water discharge pump assembly from contaminating pressurized fresh water transferred to the toilet bowl via the integral inlet valve assembly, thereby reducing odors in and around the toilet and scale formation in toilet related plumbing.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The apparatus disclosed herein addresses the above mentioned need for a manual toilet flushing apparatus comprising an integral, manually operated pressurized fresh water inlet valve assembly and a waste water discharge pump assembly that is operably isolated from the integral, manually operated pressurized fresh water inlet valve assembly for precluding waste water discharged from a toilet bowl via the waste water discharge pump assembly from contaminating pressurized fresh water transferred to the toilet bowl via the integral, manually operated pressurized fresh water inlet valve assembly, thereby reducing odors in and around the toilet bowl and scale formation in toilet related plumbing. The "manual toilet flushing apparatus" disclosed herein is hereinafter referred to as a "flushing apparatus". The "integral, manually operated pressurized fresh water inlet valve assembly" disclosed herein is hereinafter referred to as an "integral inlet valve assembly". The "waste water discharge pump assembly" disclosed herein is hereinafter referred to as a "discharge pump assembly".

The flushing apparatus disclosed herein comprises an integral inlet valve assembly and a discharge pump assembly operably isolated from each other. The integral inlet valve assembly comprises a pressurized fresh water inlet port, an inlet valve body, a check valve, a lever, a first plunger, a second plunger, and an outlet port. The pressurized fresh water inlet port receives pressurized fresh water from a fresh water source. The fresh water source is, for example, a pressurized water source such as an on-demand pump with a water tank. The inlet valve body is fixedly connected to the pressurized fresh water inlet port. The inlet valve body comprises an inlet valve cavity in fluid communication with the pressurized fresh water inlet port. The inlet valve cavity contains and transfers the pressurized fresh water from the fresh water source to a rim of a toilet bowl. As used herein, the term "rim" refers to an annular cavity defined at an upper section of the toilet bowl to contain and transfer inlet pressurized fresh water to flush the toilet bowl.

In an embodiment, the integral inlet valve assembly of the flushing apparatus disclosed herein further comprises a filter screen fixedly attached to the pressurized fresh water inlet port of the integral inlet valve assembly. The filter screen traps microparticulates from the pressurized fresh water. The check valve of the integral inlet valve assembly is positioned in the inlet valve cavity of the inlet valve body and proximal to the pressurized fresh water inlet port. The check valve opens and closes to direct the flow of the pressurized fresh water from the pressurized fresh water inlet port into the inlet valve cavity. The check valve is removably positioned within the inlet valve cavity to facilitate repair and maintenance of the integral inlet valve assembly. The lever of the integral inlet valve assembly is positioned proximal to a distal end of the inlet valve cavity. The lever is easily accessible and actuates the check valve to allow rinse water or the pressurized fresh water to rinse the toilet bowl independent of the discharge pump assembly. That is, the actuation of the check valve by the lever for rinsing the toilet bowl is independent of the discharge of the waste water from the toilet bowl through the discharge pump assembly. The first plunger of the integral inlet valve assembly is positioned in the inlet valve cavity and is operably connected between the lever and the second plunger. The first plunger, in communication with the lever, actuates the second plunger.

The second plunger of the integral inlet valve assembly is positioned in the inlet valve cavity of the inlet valve body and is operably connected between the first plunger and the check valve. The second plunger, in communication with the first plunger, actuates the check valve to open and close the check valve. In an embodiment, the integral inlet valve assembly further comprises a diaphragm member positioned between the first plunger and the second plunger. The diaphragm member is fixedly connected to the opposing walls of the inlet valve cavity. The diaphragm member isolates the first plunger from the second plunger. The outlet port of the integral inlet valve assembly extends from the inlet valve body and is in fluid communication with the inlet valve cavity. The outlet port directs the flow of the pressurized fresh water from the inlet valve cavity to the rim of the toilet bowl through an outlet hose removably connected to and in fluid communication with the outlet port. In an embodiment, a vacuum breaker is positioned above the rim of the toilet bowl. The vacuum breaker is in fluid communication with the outlet hose and prevents a back flow of the pressurized fresh water to the integral inlet valve assembly from the rim of the toilet bowl via the outlet hose.

The discharge pump assembly of the flushing apparatus disclosed herein comprises a waste water inlet port, a discharge pump body, a retractable handle, a connecting rod, a piston, and a discharge port. The waste water inlet port of the discharge pump assembly is positioned at a lower section of the discharge pump body. The waste water inlet port receives the waste water from the toilet bowl via a waste water pipe. The discharge pump body of the discharge pump assembly comprises a pump cavity in fluid communication with the waste water pipe via the waste water inlet port to transfer the waste water from the toilet bowl to the discharge port. The retractable handle of the discharge pump assembly is positioned above the pump cavity of the discharge pump body. In an embodiment, the retractable handle is secured within a sleeve of the connecting rod. The retractable handle retracts in a substantially vertical direction within the sleeve in an upward direction and a downward direction. In an embodiment, the sleeve is configured as an integral socket to receive the retractable handle. The connecting rod of the discharge pump assembly is positioned within the pump cavity and is hingedly connected between the retractable handle and the piston. The connecting rod, in communication with the retractable handle, actuates the piston in a forward direction and a backward direction. The piston of the discharge pump assembly is positioned within the pump cavity and is operably connected to the connecting rod. The piston is actuated, for example, in the backward direction by the connecting rod which suctions the waste water into the pump cavity. The piston is actuated, for example, in the forward direction by the connecting rod which discharges the waste water through the discharge port. In an embodiment, the piston within the discharge pump body is oriented at a predefined inclination to a vertical axis such that the piston is in line with the discharge port to prevent clogging of the pump cavity and the discharge port. The discharge port of the discharge pump assembly extends from the discharge pump body and is in fluid communication with the pump cavity. The discharge port discharges the waste water from the pump cavity to a waste holding tank.

In an embodiment, the discharge pump assembly of the flushing apparatus disclosed herein further comprises a flapper valve member positioned proximal to the lower section of the pump cavity of the discharge pump body and secured to the waste water inlet port, for example, via a thread member. The flapper valve member opens during movement of the piston in the backward direction to transfer the waste water from the lower section of the pump cavity to an upper section of the pump cavity via the waste water inlet port. The flapper valve member closes during movement of the piston in the forward direction to discharge the waste water contained in the upper section of the pump cavity through the discharge port. In an embodiment, the flapper valve member prevents a back flow of the waste water to the toilet bowl via the waste water pipe in fluid communication with the pump cavity of the discharge pump body by closing the waste water inlet port.

In an embodiment, the integral inlet valve assembly and the discharge pump assembly of the flushing apparatus disclosed herein are positioned in close proximity behind a cover member for facilitating ease of operation of the flushing apparatus and a clean installation of the flushing apparatus. The discharge pump body of the discharge pump assembly is oriented at a predefined inclination to a vertical axis for facilitating a flexible pumping action of the piston in communication with the retractable handle. In an embodiment, the discharge pump assembly further comprises a piston cap operably connected proximal to a rear surface of the piston of the discharge pump assembly. The piston cap secures a circular diaphragm to the piston. In an embodiment, a predefined geometry of the piston maintains a consistent stroke for the circular diaphragm.

In an embodiment, the flushing apparatus disclosed herein further comprises a locking cam pivotally connected to an upper section of the discharge pump body of the discharge pump assembly. The locking cam locks the retractable handle when the piston is completely pushed to a forward position by rotating and positioning the locking cam below a lower end of the retractable handle. In an embodiment, the discharge pump assembly of the flushing apparatus disclosed herein further comprises an elastomeric stopper attached to a rear surface of the piston of the discharge pump assembly. The elastomeric stopper seals the discharge port of the discharge pump assembly to prevent a back flow of the waste water into the toilet bowl via the waste water pipe in fluid communication with the discharge port, after the piston is completely pushed to a forward position and locked in the forward position using the locking cam. In an embodiment, the discharge pump assembly further comprises a discharge fitting removably connected to the discharge port. The discharge fitting transfers the waste water from the discharge port to the waste holding tank via a discharge outlet pipe. In an embodiment, the discharge fitting rotates 360 degrees with respect to a vertical axis of the discharge fitting to connect to the discharge outlet pipe at multiple angles.

Disclosed herein is also a method for receiving pressurized fresh water and discharging waste water without contamination of the pressurized fresh water. The flushing apparatus comprises an integral inlet valve assembly and a discharge pump assembly as disclosed above. By actuating the lever in communication with the first plunger and the second plunger and opening the check valve of the integral inlet valve assembly, pressurized fresh water from a fresh water source is received at the pressurized fresh water inlet port of the integral inlet valve assembly and the flow of the pressurized fresh water is directed into the inlet valve cavity of the inlet valve body. The received pressurized fresh water is then transferred from the inlet valve cavity to a rim of a toilet bowl via the outlet port of the integral inlet valve assembly and through the outlet hose removably connected to and in fluid communication with the outlet port. The transferred pressurized fresh water discharged from the rim of the toilet bowl into the toilet bowl flushes and rinses the toilet bowl.

The waste water formed in the toilet bowl is drained through the waste water pipe in fluid communication with the toilet bowl. By actuating the retractable handle in a backward direction, which pulls the piston hingedly connected to the retractable handle via the connecting rod in a backward direction in the pump cavity of the discharge pump body, the pump cavity of the discharge pump body of the discharge pump assembly suctions the waste water through the waste water inlet port. Furthermore, actuating the retractable handle in a forward direction pushes the piston in a forward direction in the pump cavity containing the suctioned waste water, whereby the suctioned waste water contained in the pump cavity is discharged through the discharge port to a waste holding tank. In an embodiment, the method disclosed herein prevents a back flow of the waste water from the discharge outlet pipe via the discharge port into the pump cavity using a discharge check valve coupling removably connected to the discharge port and the discharge fitting of the discharge pump assembly, when the retractable handle is actuated in the backward direction to pull the piston in the backward direction in the pump cavity and suction the waste water into the pump cavity via the waste water inlet port of the discharge pump assembly. The discharge check valve coupling further allows the waste water to exit the pump cavity via the discharge port, when the retractable handle is actuated in the forward direction to push the piston in the forward direction in the pump cavity and discharge the waste water through the discharge port to the waste holding tank.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a structure or a method step referenced by a numeral in a drawing carries over to the description of that structure or method step shown by that same numeral in any subsequent drawing herein.

DETAILED DESCRIPTION OF THE INVENTION

Figure 1A:
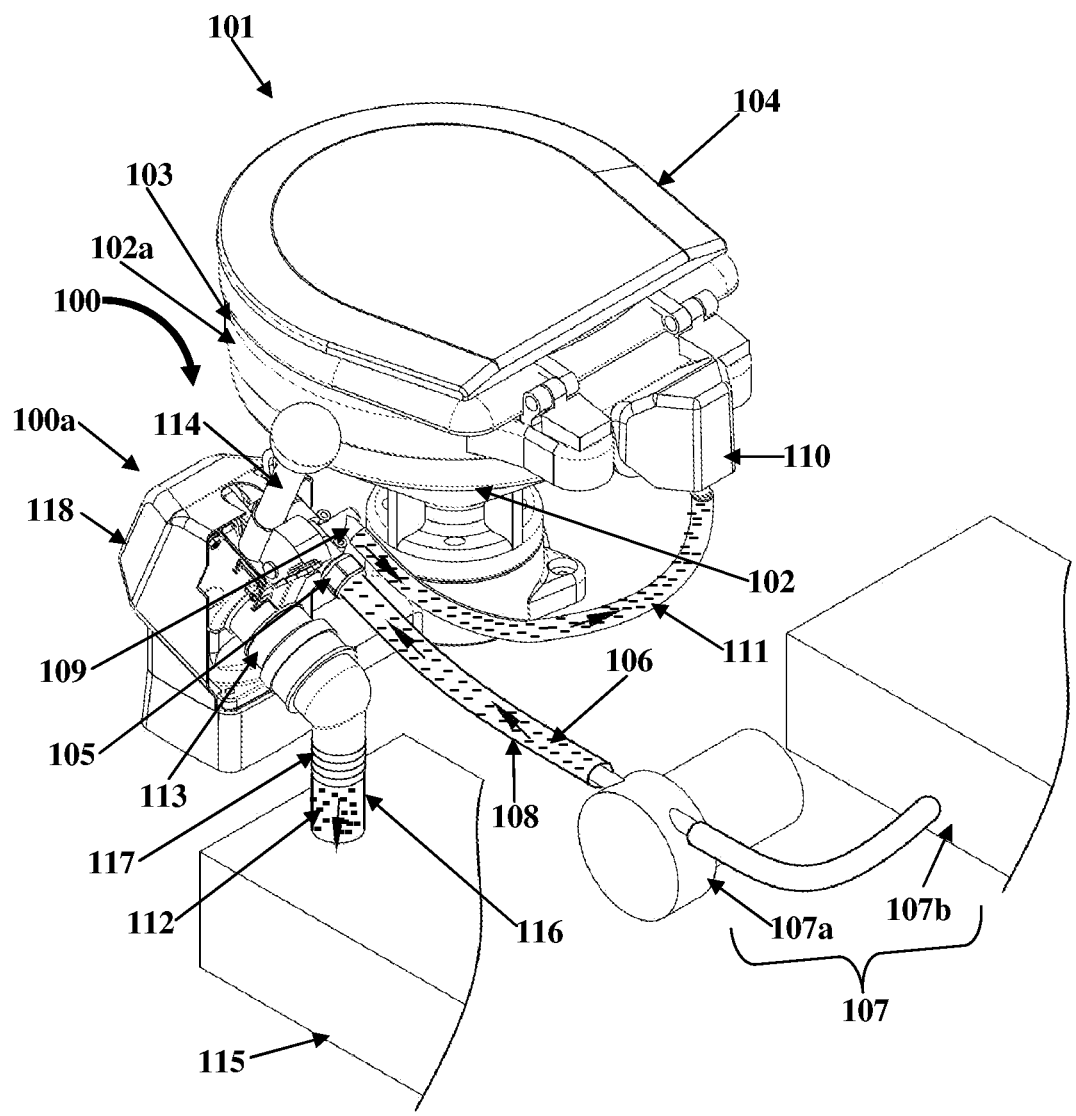
FIG. 1A exemplarily illustrates a rear perspective view of a flushing apparatus operably connected to a toilet.
Figure 1B:
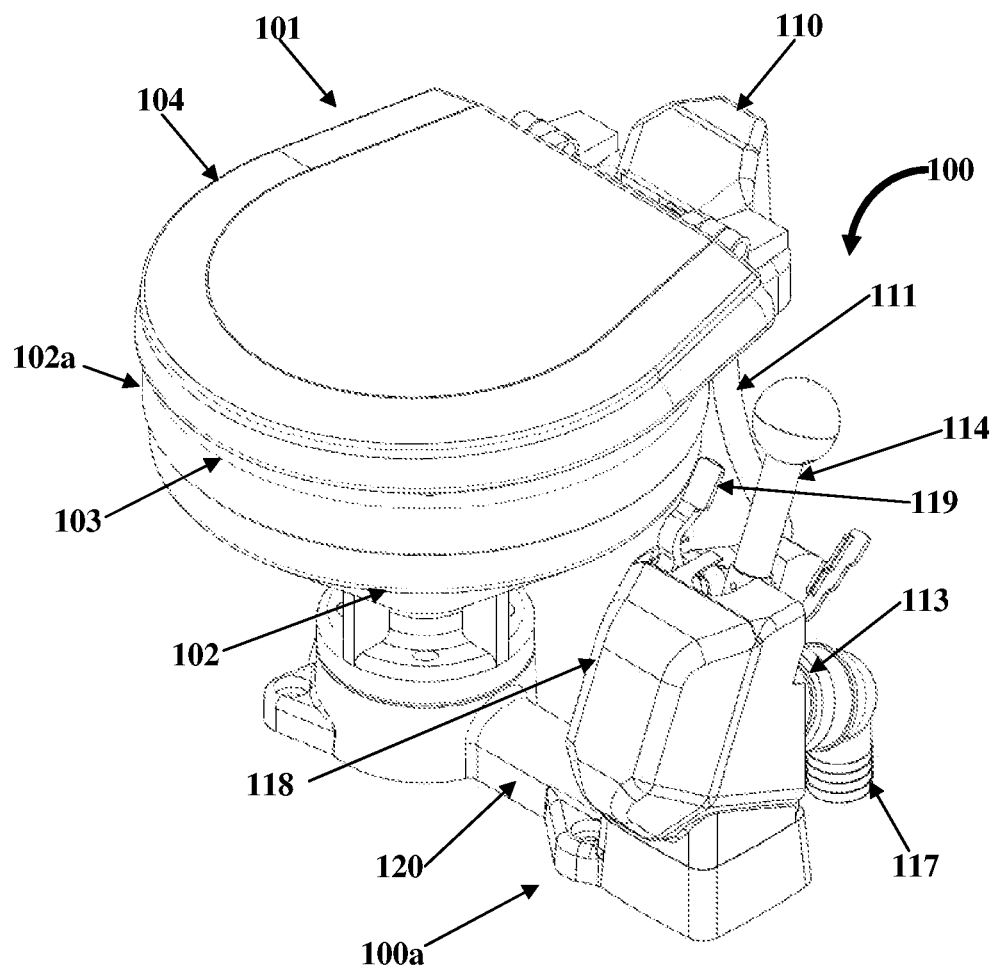
FIG. 1B exemplarily illustrates a front perspective view of the flushing apparatus operably connected to the toilet.

FIGS. 1A-1B exemplarily illustrate a rear perspective view and a front perspective view respectively, of a flushing apparatus 100 operably connected to a toilet 101. The flushing apparatus 100 disclosed herein is, for example, a manual toilet flushing apparatus. The toilet 101 comprises a toilet bowl 102, a rim 103 positioned at an upper section 102a of the toilet bowl 102, and a lid 104 hingedly connected to the upper section 102a of the toilet bowl 102 to cover the toilet bowl 102. As used herein, the term "rim" refers to an annular cavity defined at an upper section 102a of the toilet bowl 102 to contain and transfer pressurized fresh water 106 to flush the toilet bowl 102. When a lever 119 of the flushing apparatus 100 exemplarily illustrated in FIG. 1B is actuated, a pressurized fresh water inlet port 105 of the flushing apparatus 100 opens to receive pressurized fresh water 106 from a fresh water source 107 through an inlet hose member 108. The fresh water source 107 is, for example, a pressurized water source such as an on-demand pump 107a in communication with a water tank 107b as exemplarily illustrated in FIG. 1A.

Figure 2:
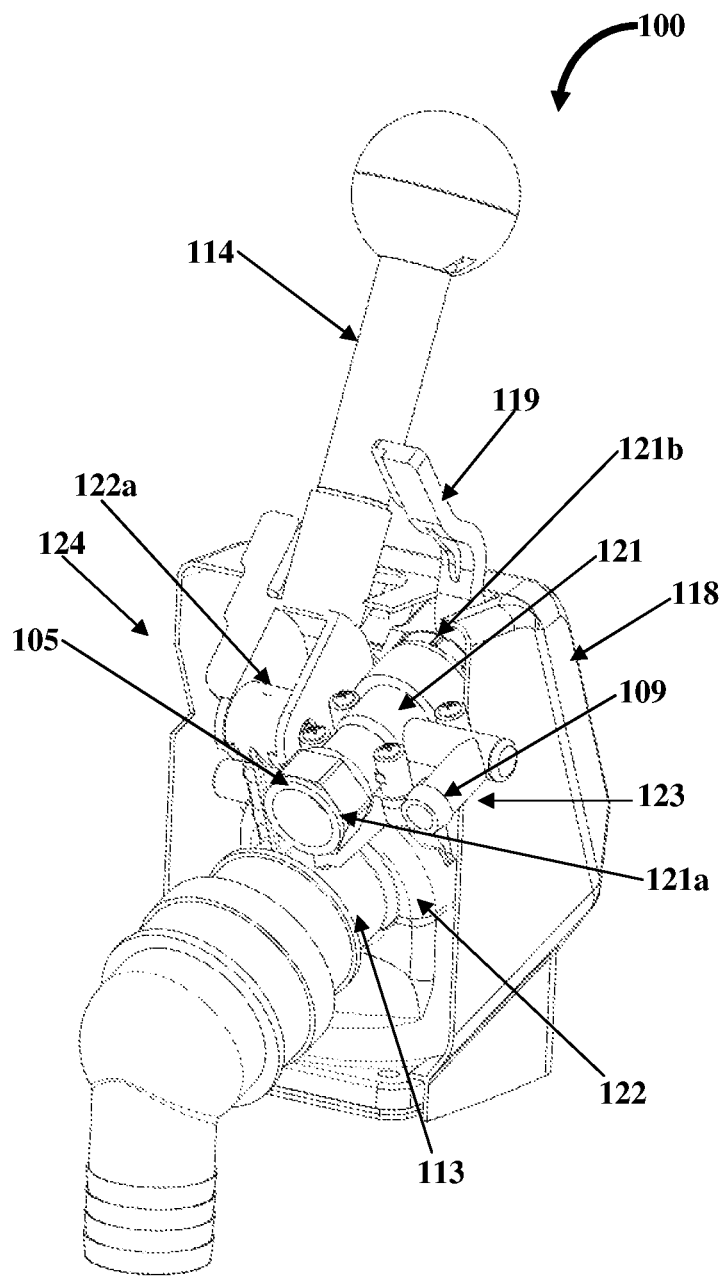
FIG. 2 exemplarily illustrates a rear perspective view of the flushing apparatus, showing an inlet valve body of an integral inlet valve assembly and a discharge pump body of a discharge pump assembly of the flushing apparatus.
Figure 3:
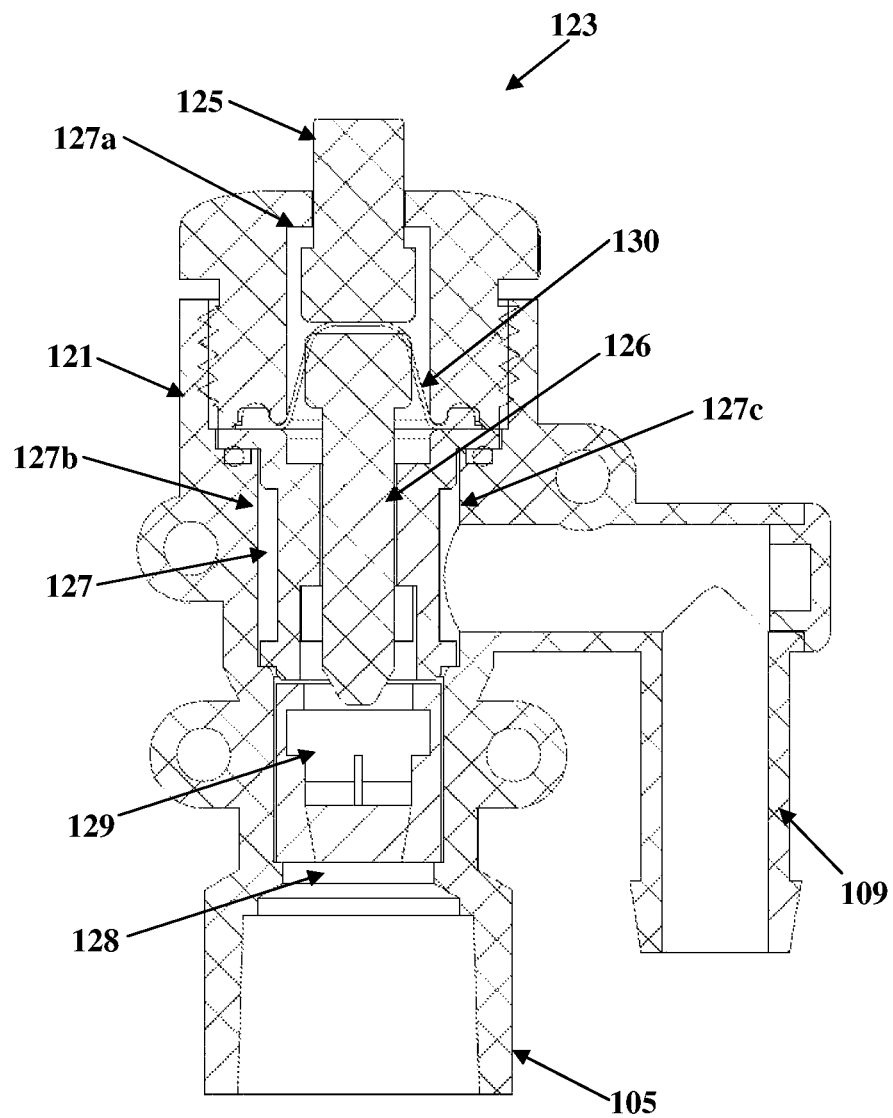
FIG. 3 exemplarily illustrates a partial sectional view of the integral inlet valve assembly of the flushing apparatus.

As exemplarily illustrated in FIG. 1B, the lever 119 is easily accessible and operates or actuates a check valve 129 exemplarily illustrated in FIG. 3, to allow the pressurized fresh water 106 to rinse the toilet bowl 102. The actuation of the check valve 129 by the lever 119 for rinsing the toilet bowl 102 is independent of the discharge of waste water 112 from the toilet bowl 102 through a waste water discharge pump assembly 124 of the flushing apparatus 100 exemplarily illustrated in FIG. 2 and FIG. 4. The pressurized fresh water 106 is transferred from the pressurized fresh water inlet port 105 to an outlet port 109 of the flushing apparatus 100, which is in fluid communication with the pressurized fresh water inlet port 105. The pressurized fresh water 106 is transferred from the outlet port 109 to a vacuum breaker 110 positioned above the rim 103 of the toilet bowl 102 via an outlet hose 111 removably connected between the outlet port 109 and the vacuum breaker 110 as disclosed in the detailed description of FIG. 7. The vacuum breaker 110 prevents a back flow of the pressurized fresh water 106 from the rim 103 of the toilet bowl 102 to the outlet hose 111. The pressurized fresh water 106 is flushed within the toilet bowl 102 and thereafter discharged as waste water 112 as exemplarily illustrated FIG. 1A. The waste water 112 from the toilet bowl 102, after flushing, is transferred through a waste water pipe 120 exemplarily illustrated in FIG. 1B, in fluid communication with the toilet bowl 102, and is discharged through a discharge port 113 of the flushing apparatus 100 by the actuation of a retractable handle 114 of the flushing apparatus 100. The waste water 112 is discharged through the discharge port 113 to a waste holding tank 115 as exemplarily illustrated in FIG. 1A, for example, a treatment unit via a discharge outlet pipe 116. A discharge fitting 117 removably connects the discharge outlet pipe 116 to the discharge port 113. A cover member 118 is used to cover a front section 100a of the flushing apparatus 100.

FIG. 2 exemplarily illustrates a rear perspective view of the flushing apparatus 100, showing an inlet valve body 121 of an integral inlet valve assembly 123 and a discharge pump body 122 of the discharge pump assembly 124 of the flushing apparatus 100. As exemplarily illustrated in FIG. 2, the integral inlet valve assembly 123 comprises the pressurized fresh water inlet port 105, the inlet valve body 121, the lever 119, and the outlet port 109. The inlet valve body 121 is, for example, an elongate structure comprising an inlet valve cavity 127 exemplarily illustrated in FIG. 3. The pressurized fresh water inlet port 105 is positioned at one end 121a of the inlet valve body 121. The lever 119 is operably positioned at a distal end 121b of the inlet valve body 121. The outlet port 109 extends outwardly from the inlet valve body 121 and is in fluid communication with the inlet valve cavity 127 of the inlet valve body 121. The discharge pump assembly 124 comprises the discharge pump body 122, the retractable handle 114, and the discharge port 113. The discharge pump body 122 comprises a pump cavity 134 exemplarily illustrated in FIG. 4. The discharge port 113 is in fluid communication with the pump cavity 134 of the discharge pump body 122. The retractable handle 114 is positioned at an upper section 122a of the discharge pump body 122.

FIG. 3 exemplarily illustrates a partial sectional view of the integral inlet valve assembly 123 of the flushing apparatus 100 exemplarily illustrated in FIG. 2. The integral inlet valve assembly 123 is an integral manually operated pressurized fresh water inlet valve assembly. The pressurized fresh water inlet port 105 of the integral inlet valve assembly 123 receives the pressurized fresh water 106 from a fresh water source 107 exemplarily illustrated in FIG. 1A. In an embodiment, the integral inlet valve assembly 123 further comprises a built-in filter screen 128 fixedly attached to the pressurized fresh water inlet port 105. The filter screen 128 traps microparticulates, for example, particulate matter such as dust, from the pressurized fresh water 106. The filter screen 128 is, for example, a built-in screen that traps debris in the pressurized fresh water 106 that may prevent the check valve 129 of the integral inlet valve assembly 123 from closing and opening. The inlet valve body 121 of the integral inlet valve assembly 123 is fixedly connected to the pressurized fresh water inlet port 105. The inlet valve body 121 comprises the inlet valve cavity 127 in fluid communication with the pressurized fresh water inlet port 105. The inlet valve cavity 127 contains and transfers the pressurized fresh water 106 from the fresh water source 107 to the rim 103 of a toilet bowl 102 exemplarily illustrated in FIG. 1A.

In addition to the pressurized fresh water inlet port 105, the inlet valve body 121, the lever 119, and the outlet port 109 exemplarily illustrated in FIGS. 1A-1B and FIG. 2, the integral inlet valve assembly 123 further comprises the check valve 129, a first plunger 125, and a second plunger 126. The check valve 129 is removably positioned in the inlet valve cavity 127 of the inlet valve body 121 and proximal to the pressurized fresh water inlet port 105. The check valve 129 opens and closes to direct a flow of the pressurized fresh water 106 from the pressurized fresh water inlet port 105 into the inlet valve cavity 127. The check valve 129 is configured, for example, as a removable valve cartridge for easy repair and rebuilding or maintenance of the integral inlet valve assembly 123. The lever 119, exemplarily illustrated in FIG. 2, is positioned proximal to a distal end 127a of the inlet valve cavity 127. The first plunger 125 is positioned in the inlet valve cavity 127 and is operably connected between the lever 119 and the second plunger 126. The first plunger 125, in communication with the lever 119, actuates the second plunger 126.

The second plunger 126 is positioned in the inlet valve cavity 127 of the inlet valve body 121 and is operably connected between the first plunger 125 and the check valve 129. The second plunger 126, in communication with the first plunger 125, actuates the check valve 129 to open and close the check valve 129. In an embodiment, the integral inlet valve assembly 123 further comprises a diaphragm member 130 positioned between the first plunger 125 and the second plunger 126 and fixedly connected to opposing walls 127b and 127c of the inlet valve cavity 127. The diaphragm member 130 isolates the first plunger 125 from the second plunger 126. The diaphragm member 130 is, for example, a sealing member. The diaphragm member 130 follows the movement of the plungers 125 and 126 when operated by the lever 119. In an embodiment, the integral inlet valve assembly 123 comprises multiple plungers in the inlet valve cavity 127. The diaphragm member 130, for example, isolates the pressurized fresh water 106 from the first plunger 125 precluding the need for shaft sealing components on the first plunger 125.

The outlet port 109 extends from the inlet valve body 121 and is in fluid communication with the inlet valve cavity 127 of the inlet valve body 121. The outlet port 109 directs the flow of the pressurized fresh water 106 from the inlet valve cavity 127 to the rim 103 of the toilet bowl 102 through an outlet hose 111 removably connected to and in fluid communication with the outlet port 109 as exemplarily illustrated in FIGS. 1A-1B. In an embodiment, the integral inlet valve assembly 123 and the discharge pump assembly 124 are positioned in close proximity behind the cover member 118 exemplarily illustrated in FIG. 2, to facilitate ease of operation of the flushing apparatus 100 and a clean installation of the flushing apparatus 100.

Figure 4:
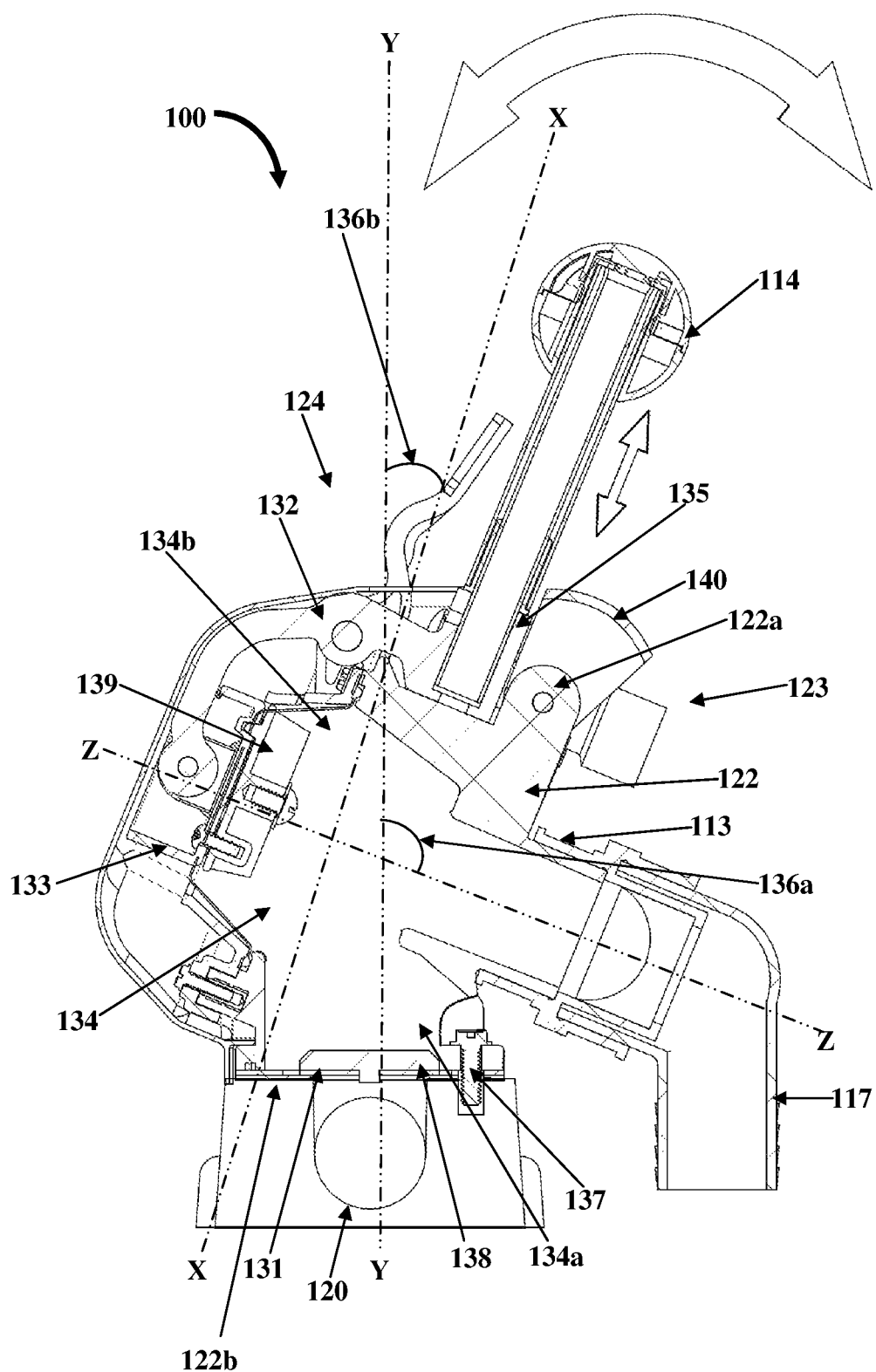
FIG. 4 exemplarily illustrates a sectional view of the discharge pump assembly of the flushing apparatus.

FIG. 4 exemplarily illustrates a sectional view of the discharge pump assembly 124 of the flushing apparatus 100. The discharge pump assembly 124 comprises a waste water inlet port 131, the discharge pump body 122, the retractable handle 114, a connecting rod 132, a piston 133, and the discharge port 113. The waste water inlet port 131 is positioned at a lower section 122b of the discharge pump body 122. The waste water inlet port 131 is positioned proximal to a lower section 134a of the pump cavity 134 of the discharge pump body 122. The waste water inlet port 131 receives the waste water 112 from the toilet bowl 102 via a waste water pipe 120 as exemplarily illustrated in FIGS. 1A-1B. The pump cavity 134 of the discharge pump body 122 is in fluid communication with the waste water pipe 120 via the waste water inlet port 131. The waste water pipe 120 transfers waste water 112 from the toilet bowl 102 to the discharge port 113 as exemplarily illustrated in FIGS. 1A-1B. The retractable handle 114 is positioned above the pump cavity 134 at an upper section 122a of the discharge pump body 122. In an embodiment, the retractable handle 114 is secured within a sleeve 135 of the connecting rod 132. The retractable handle 114 retracts in a substantially vertical direction within the sleeve 135 in an upward direction and a downward direction as exemplarily illustrated in FIG. 9B. The sleeve 135 is configured, for example, as an integral socket for receiving the retractable handle 114.

The connecting rod 132 is positioned within the pump cavity 134 of the discharge pump body 122 and is hingedly connected between the retractable handle 114 and the piston 133. The connecting rod 132, in communication with the retractable handle 114, actuates the piston 133 in a forward direction and a backward direction as indicated by an arrow in FIG. 4. The piston 133 is positioned within the pump cavity 134 and is operably connected to the connecting rod 132. The piston 133 actuated in a backward direction by the connecting rod 132 suctions the waste water 112 into the pump cavity 134. The piston 133 actuated in the forward direction by the connecting rod 132 discharges the waste water 112 through the discharge port 113. The angle of inclination 136a of the discharge port 113 relative to pumping action of the piston 133 prevents clogging of the pump cavity 134. The angle of inclination 136a of the discharge port 113 is exemplarily illustrated by the angle of inclination 136a between the inclined axis ZZ of the discharge port 113 and the vertical axis YY. In an embodiment, the piston 133 within the discharge pump body 122 is oriented at a predefined inclination 136b to a vertical axis YY such that the piston 133 is in line with the discharge port 113 to prevent clogging of the pump cavity 134 and the discharge port 113.

The discharge port 113 extends from the discharge pump body 122 and is in fluid communication with the pump cavity 134 of the discharge pump body 122. The discharge port 113 discharges the waste water 112 from the pump cavity 134 to a waste holding tank 115 exemplarily illustrated in FIG. 1A. In an embodiment, the discharge pump body 122 is positioned proximal to the integral inlet valve assembly 123 and oriented at a predefined inclination 136b to a vertical axis YY, exemplarily illustrated by the predefined inclination 136b between the inclined axis XX of the discharge pump body 122 and the vertical axis YY. The predefined inclination 136b of the discharge pump body 122 facilitates a flexible pumping action of the piston 133 in communication with the retractable handle 114.

In an embodiment, the discharge pump assembly 124 of the flushing apparatus 100 disclosed herein further comprises a flapper valve member 138 positioned proximal to the lower section 134a of the pump cavity 134 of the discharge pump body 122 and secured to the waste water inlet port 131 via a thread member 137. The flapper valve member 138 opens during movement of the piston 133 in the backward direction to transfer the waste water 112 from the lower section 134a of the pump cavity 134 to an upper section 134b of the pump cavity 134 via the waste water inlet port 131. The flapper valve member 138 closes during movement of the piston 133 in the forward direction to discharge the waste water 112 contained in the upper section 134b of the pump cavity 134 through the discharge port 113. The flapper valve member 138 opens and closes due to suction and pressure caused by the pumping action of the piston 133 within the pump cavity 134. In an embodiment, the flapper valve member 138 prevents a back flow of the waste water 112 to the toilet bowl 102 via the waste water pipe 120 in fluid communication with the pump cavity 134 by closing the waste water inlet port 131.

The discharge pump assembly 124 is operably isolated from the integral inlet valve assembly 123 to preclude waste water 112 discharged from the toilet bowl 102 via the discharge pump assembly 124 from contaminating the pressurized fresh water 106 transferred to the toilet bowl 102 exemplarily illustrated in FIG. 1A, via the integral inlet valve assembly 123, thereby reducing odors in and around the toilet bowl 102 and avoiding contamination of potable water flowing through the main potable pipe lines in fluid communication with toilet plumbing. The integral inlet valve assembly 123 and the discharge pump assembly 124 are positioned in close proximity and behind the cover member 118 as exemplarily illustrated in FIGS. 1A-1B and FIG. 2, for easier operation and a cleaner installation. In an embodiment, the flushing apparatus 100 disclosed herein further comprises an elastomeric stopper 139, a locking cam 140, and a discharge fitting 117 as disclosed in the detailed description of FIGS. 9A-9B, FIGS. 10A-10B, and FIG. 12.

Figure 5A:
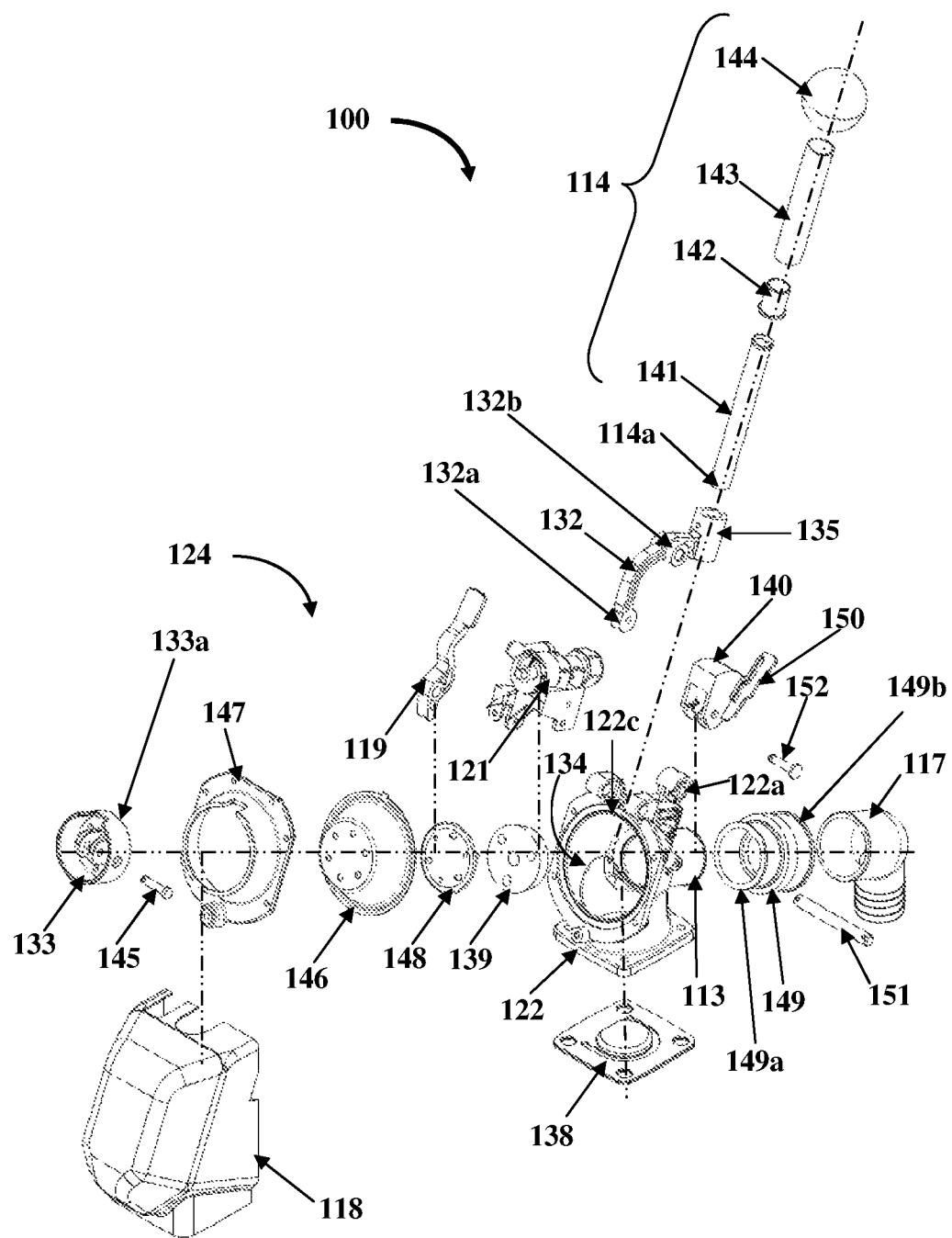
FIG. 5A exemplarily illustrates a partial exploded view of the flushing apparatus.

FIG. 5A exemplarily illustrates a partial exploded view of the flushing apparatus 100. The cover member 118 is a pump assembly cover configured to cover the flushing apparatus 100. The cover member 118 is removed during cleaning or maintenance. The discharge pump body 122 comprises the pump cavity 134 and a support section 122c for a circular diaphragm 146. The discharge pump body 122 also supports the waste water inlet port 131 exemplarily illustrated in FIG. 4, and the discharge port 113. The retractable handle 114 comprises an inner tube 141, a tube bushing 142, an outer tube 143, and a handle knob 144. The inner tube 141 is secured within the sleeve 135 of the connecting rod 132. The inner tube 141 allows the retractable handle 114 to extend in an upward direction, thereby extending the length of the retractable handle 114 for pumping ease. The tube bushing 142 is secured to the outer tube 143 and guides the outer tube 143 over the inner tube 141 when the retractable handle 114 is extended or retracted. The handle knob 144 is connected to the outer tube 143 and is used to grip and actuate the retractable handle 114 in a forward direction and a backward direction.

The connecting rod 132 is, for example, a piston lever. The connecting rod 132 comprises the sleeve 135 that receives the inner tube 141 of the retractable handle 114 to connect the retractable handle 114 to the connecting rod 132. One end 132a of the connecting rod 132 is fastened to the piston 133 via a clevis pin 145. The connecting rod 132 connects the retractable handle 114 to the piston 133. A piston lever shaft 151 is operably connected to an upper section 132b of the connecting rod 132. The piston lever shaft 151 enables a pivotal connection of the connecting rod 132 within the discharge pump body 122.

The piston 133 is, for example, a diaphragm piston. The piston 133 is connected to the circular diaphragm 146 on the rear surface 133a of the piston 133. When the retractable handle 114 is moved in a forward direction, the piston 133 in communication with the connecting rod 132 and the retractable handle 114 forces the circular diaphragm 146 in a forward direction in the pump cavity 134 of the discharge pump body 122. When the circular diaphragm 146 is forced into the pump cavity 134, a pressure is created within the pump cavity 134, which forces the waste water 112 exemplarily illustrated in FIG. 1A, out from the pump cavity 134 through the discharge port 113. When the retractable handle 114 is moved in a backward direction, the piston 133 in communication with the connecting rod 132 and the retractable handle 114 moves the circular diaphragm 146 in a backward direction out of the pump cavity 134 of the discharge pump body 122. When the circular diaphragm 146 is pulled away from the pump cavity 134, a suction force is created drawing the waste water 112 from the toilet bowl 102 through the waste water pipe 120, the waste water inlet port 131, and the flapper valve member 138 into the pump cavity 134 as exemplarily illustrated in FIG. 13B. The flapper valve member 138 is fixedly connected to the waste water inlet port 131 as exemplarily illustrated in FIG. 4. The flapper valve member 138 allows waste water 112 to enter the pump cavity 134 of the discharge pump body 122 from the waste water pipe 120 via the waste water inlet port 131, when the retractable handle 114 is moved in a backward direction and prevents the waste water 112 from returning to the toilet bowl 102 during a forward movement of the retractable handle 114.

When the circular diaphragm 146 is forced into the pump cavity 134 of the discharge pump body 122 by the piston 133 in communication with the retractable handle 114, the forward pressure from the circular diaphragm 146 forces the waste water 112 from the pump cavity 134 to the discharge port 113, and in turn to the waste holding tank 115 via the discharge outlet pipe 116 exemplarily illustrated in FIG. 1A. A discharge pump body top plate 147 retains the circular diaphragm 146 to the discharge pump body 122. In an embodiment, the discharge pump assembly 124 further comprises a piston cap 148 operably connected proximal to a rear surface 133a of the piston 133 of the discharge pump assembly 124. The piston cap 148 secures the circular diaphragm 146 to the piston 133. The piston cap 148 also supports an elastomeric stopper 139. The elastomeric stopper 139 is, for example, a discharge shut off seal. The elastomeric stopper 139 contacts and seals the discharge port 113 when the retractable handle 114 is secured in the forward position.

Figure 5B:
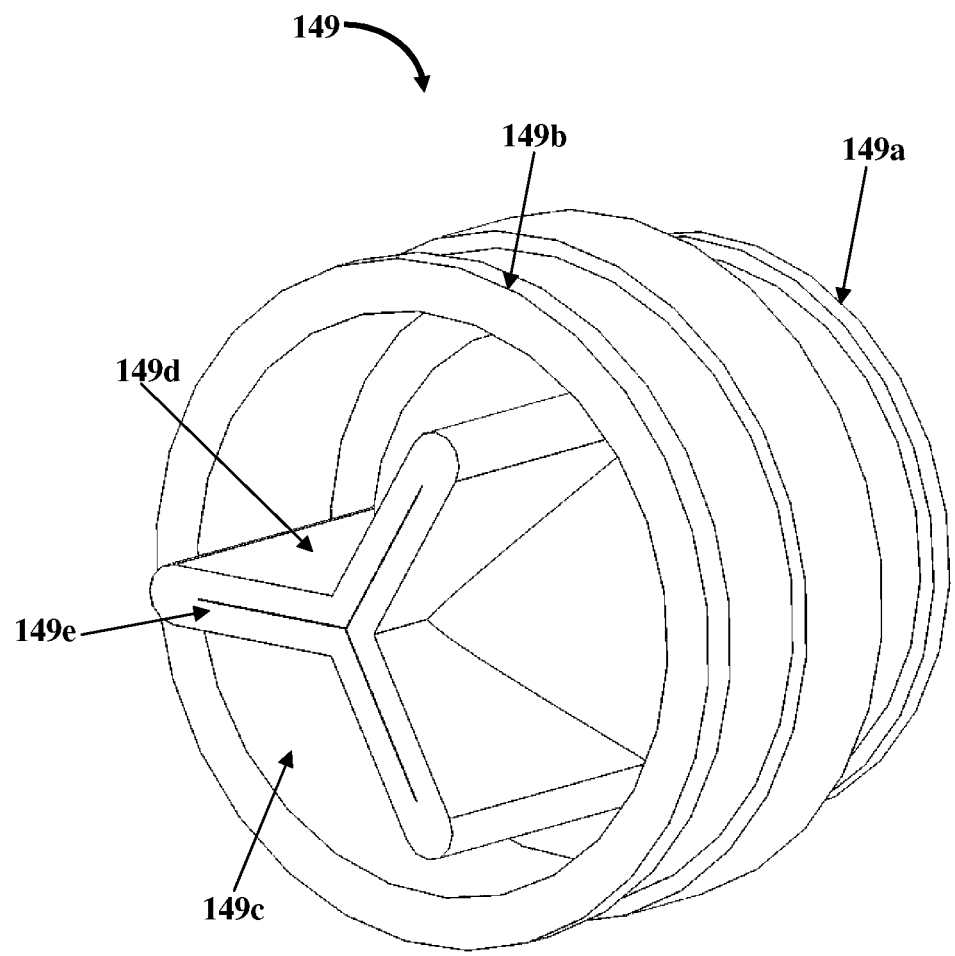
FIG. 5B exemplarily illustrates an isometric view of a discharge check valve coupling of the discharge pump assembly.
Figure 5C:
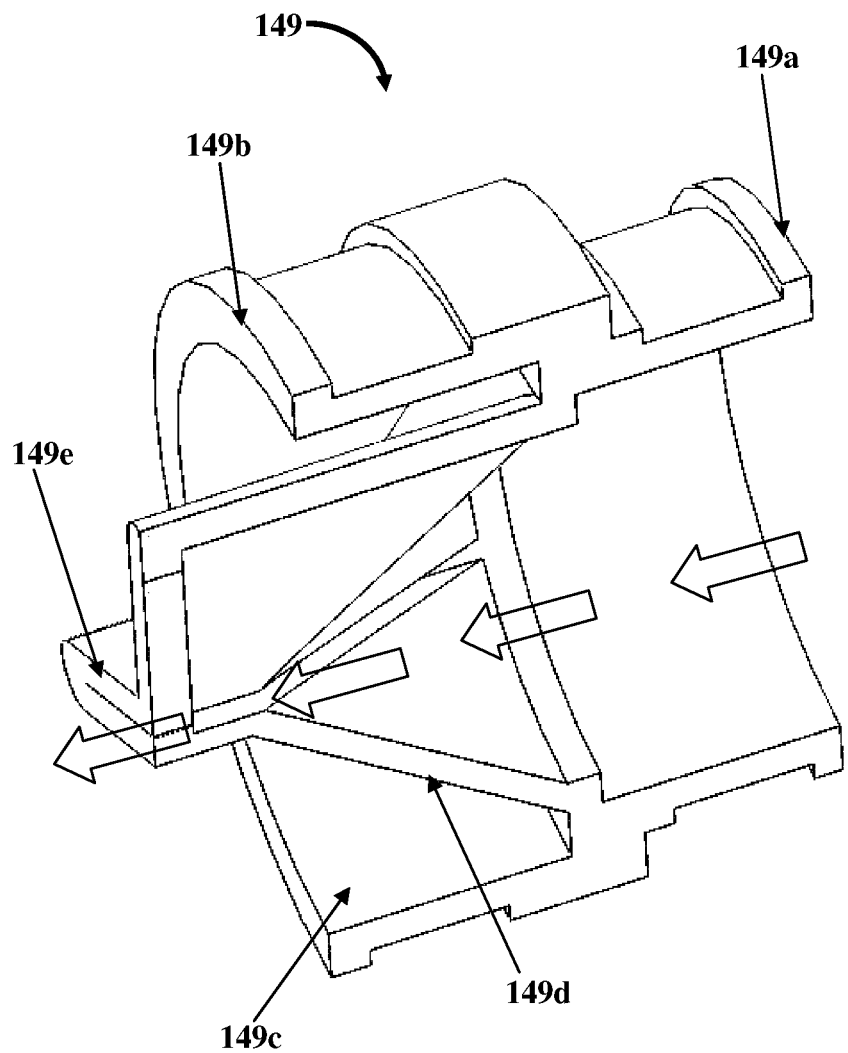
FIG. 5C exemplarily illustrates a cutaway view of the discharge check valve coupling of the discharge pump assembly.

The discharge pump assembly 124 further comprises a discharge check valve coupling 149 removably connected to the discharge port 113 and the discharge fitting 117 as disclosed in the detailed description of FIGS. 5B-5C. The discharge check valve coupling 149 couples the discharge fitting 117 to the discharge port 113. The discharge check valve coupling 149 allows the waste water 112 to exit the pump cavity 134 of the discharge pump body 122 via the discharge port 113, when the retractable handle 114 is actuated in the forward direction to push the piston 133 in the forward direction in the pump cavity 134 and discharge the waste water 112 through the discharge port 113 to the waste holding tank 115, while preventing the waste water 112 from the discharge outlet pipe 116 exemplarily illustrated in FIG. 1A, from flowing back into the pump cavity 134 via the discharge port 113, when the retractable handle 114 is actuated in a backward direction to pull the piston 133 in the backward direction in the pump cavity 134 and suction the waste water 112 into the pump cavity 134 via the waste water inlet port 131. The discharge fitting 117 is configured, for example, as a discharge elbow that connects to the discharge outlet pipe 116. The discharge fitting 117 is capable of rotating, for example, about 360 degrees, and secured in position to connect to the discharge outlet pipe 116 at any angle.

As exemplarily illustrated in FIGS. 9A-9B, the locking cam 140 locks the retractable handle 114 when the piston 133 is completely pushed to a forward position, by rotation and positioning of the locking cam 140 below a lower end 114a of the retractable handle 114 by actuating a shut off lever 150, thereby engaging the elastomeric stopper 139 to close the discharge port 113. When the retractable handle 114 is pushed in a forward direction, the locking cam 140 is flipped under the retractable handle 114 to preclude the retractable handle 114 from any movement, which moves the elastomeric stopper 139 against the discharge port 113, thereby sealing a back flow of the waste water 112 from the discharge outlet pipe 116.

As exemplarily illustrated in FIG. 5A, a shut off lever pin 152 is operably connected to the locking cam 140 to secure the locking cam 140 to the upper section 122a of the discharge pump body 122 and to enable a pivotal action of the locking cam 140 with respect to the discharge pump body 122. The lever 119 is operably connected to the inlet valve body 121 as exemplarily illustrated in FIG. 2. When a user applies force to actuate the lever 119, the lever 119 opens a check valve 129 positioned within the inlet valve body 121, exemplarily illustrated in FIG. 3, to receive pressurized fresh water 106 from a fresh water source 107 exemplarily illustrated in FIG. 1A, for flushing or rinsing.

FIGS. 5B-5C exemplarily illustrate an isometric view and a cutaway view respectively, of the discharge check valve coupling 149 of the discharge pump assembly 124 exemplarily illustrated in FIG. 5A, that removably connects the discharge port 113 to the discharge fitting 117 exemplarily illustrated in FIG. 5A. One end 149a of the discharge check valve coupling 149 is removably connected to the discharge port 113 and the other end 149b is removably connected to the discharge fitting 117 as exemplarily illustrated in FIG. 5A. The discharge check valve coupling 149 comprises a check valve member 149d axially positioned and connected within an inner cavity 149c of the discharge check valve coupling 149. The check valve member 149d is, for example, a duckbill check valve. As used herein, the phrase "duckbill check valve" refers to a one-piece elastomeric plumbing component that functions as a backflow prevention device such as a one-way valve or a non-return valve. The check valve member 149d further comprises a frontal section 149e of a generally duckbill shape which opens and closes depending on the direction of flow of the waste water 112 exemplarily illustrated in FIG. 1A.

Figure 10A:
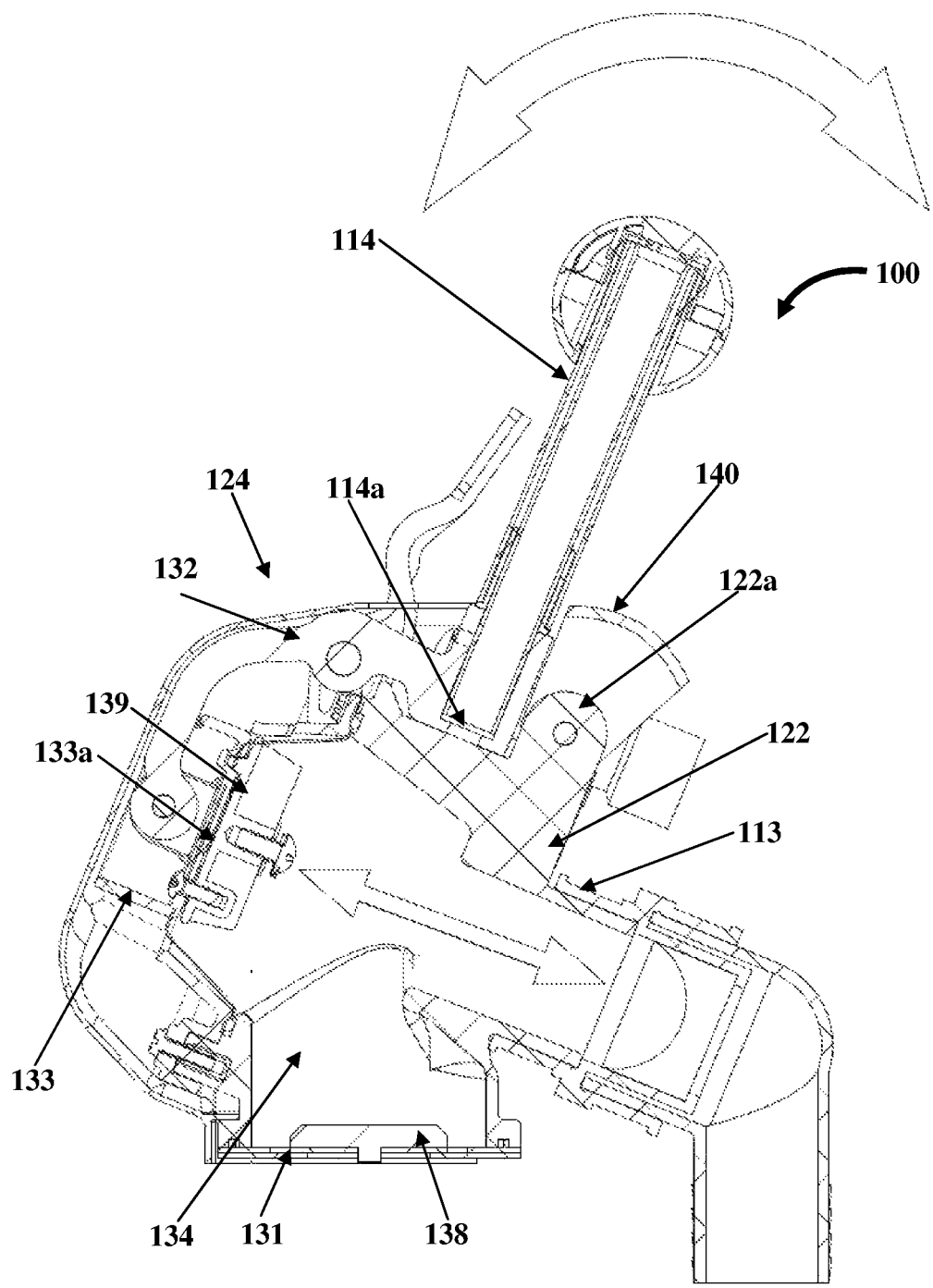
FIG. 10A exemplarily illustrates a sectional view of the flushing apparatus, showing movement of the retractable handle and a piston of the discharge pump assembly in a forward direction and a backward direction.
Figure 10B:
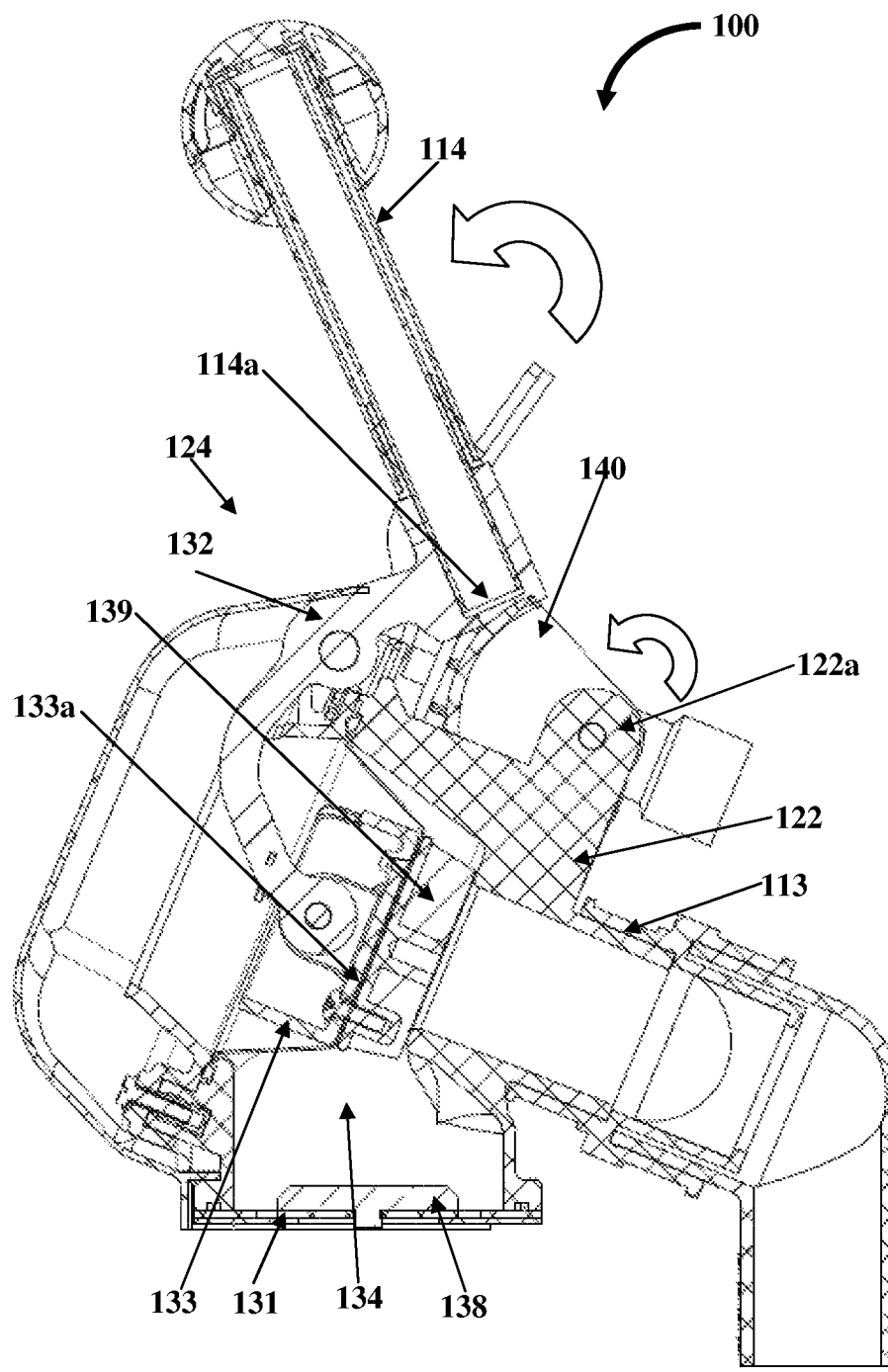
FIG. 10B exemplarily illustrates a sectional view of the flushing apparatus, showing an elastomeric stopper and a locking cam in a resting position.

As exemplarily illustrated in FIG. 5C and FIGS. 10A-10B, the discharge check valve coupling 149 allows the waste water 112, to exit the pump cavity 134 of the discharge pump body 122 when the retractable handle 114 is actuated in the forward direction, as the frontal section 149e of the check valve member 149d opens to allow the flow of the waste water 112 from the discharge port 113 to the discharge fitting 117 as indicated by the arrows in FIG. 5C. When the retractable handle 114 is actuated in a backward direction, a vacuum or suction is created in the pump cavity 134 and this suction causes the frontal section 149e within the check valve member 149d of the discharge check valve coupling 149 to close and prevent waste water 112 to flow back into the pump cavity 134 from the discharge fitting 117.

Figure 6:
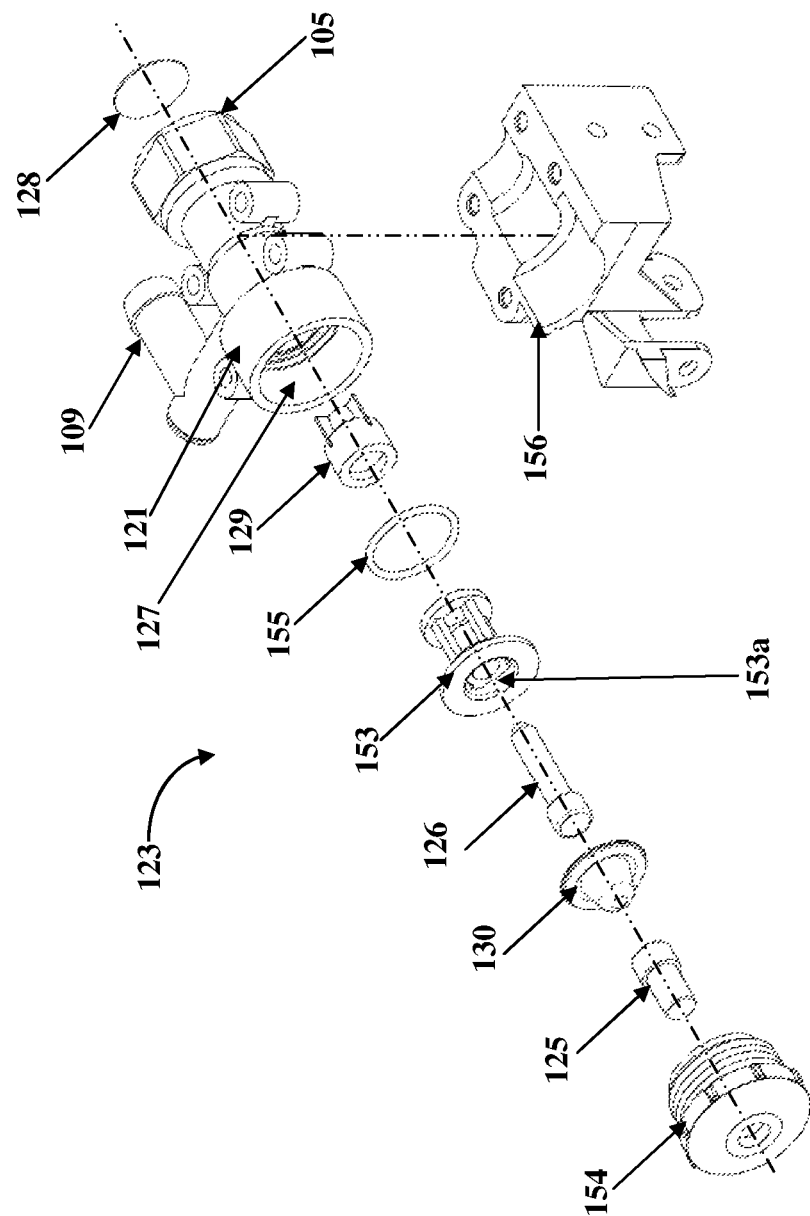
FIG. 6 exemplarily illustrates a partial exploded view of the integral inlet valve assembly of the flushing apparatus.

FIG. 6 exemplarily illustrates a partial exploded view of the integral inlet valve assembly 123. The inlet valve body 121 houses the first plunger 125, the diaphragm member 130, the second plunger 126, the check valve 129, and a plunger guide 153. An inlet valve cap 154 secures the first plunger 125, the diaphragm member 130, the second plunger 126, the plunger guide 153, and the check valve 129 in position within the inlet valve cavity 127 of the inlet valve body 121. The inlet valve cap 154 also guides the first plunger 125. The inlet valve body 121 further provides, for example, water line connections from the fresh water source 107 to the toilet bowl 102 exemplarily illustrated in FIGS. 1A-1B. The plunger guide 153 is positioned within the inlet valve cavity 127 and is operably connected to the second plunger 126. The plunger guide 153 guides the second plunger 126 in the inlet valve cavity 127 keeping the second plunger 126 in axial alignment with the check valve 129, and limits the inward movement of the second plunger 126 to prevent the second plunger 126 from extending beyond the check valve 129. The plunger guide 153 contains an opening 153a at the end of the diaphragm member 130 to ensure that the pressurized fresh water 106, exemplarily illustrated in FIG. 1A, is not trapped in the diaphragm member 130 and allowed to drain from the diaphragm member 130.

As exemplarily illustrated in FIG. 6, a plunger guide seal 155 provides a water tight seal between the plunger guide 153 and the inlet valve body 121. The filter screen 128 is positioned proximal to the pressurized fresh water inlet port 105. The filter screen 128 filters any large or small size particles present in the pressurized fresh water 106 supplied from the fresh water source 107. A mounting bracket 156 is used to mount the inlet valve body 121. The check valve 129 opens and closes with respect to the actuation of the second plunger 126 to direct the flow of pressurized fresh water 106 from the fresh water source 107 to the outlet port 109. The outlet port 109 transfers the pressurized fresh water 106 from the inlet valve cavity 127 to the rim 103 of the toilet bowl 102 as exemplarily illustrated in FIG. 1A. When the check valve 129 is closed, the flow of pressurized fresh water 106 is prevented from the fresh water source 107.

As exemplarily illustrated in FIG. 6, the diaphragm member 130 isolates the first plunger 125 from the second plunger 126 and provides a water tight seal between the inlet valve cap 154 and the plunger guide 153. When a user actuates the lever 119 exemplarily illustrated in FIG. 1B and FIG. 2, the first plunger 125 moves inwardly in the inlet valve cavity 127 defined by the inlet valve body 121 to make contact with the diaphragm member 130. The diaphragm member 130 in turn moves inwardly to contact the second plunger 126, thereby actuating the second plunger 126. The actuated second plunger 126 opens the check valve 129 to allow the flow of pressurized fresh water 106 from the fresh water source 107.

Figure 7:
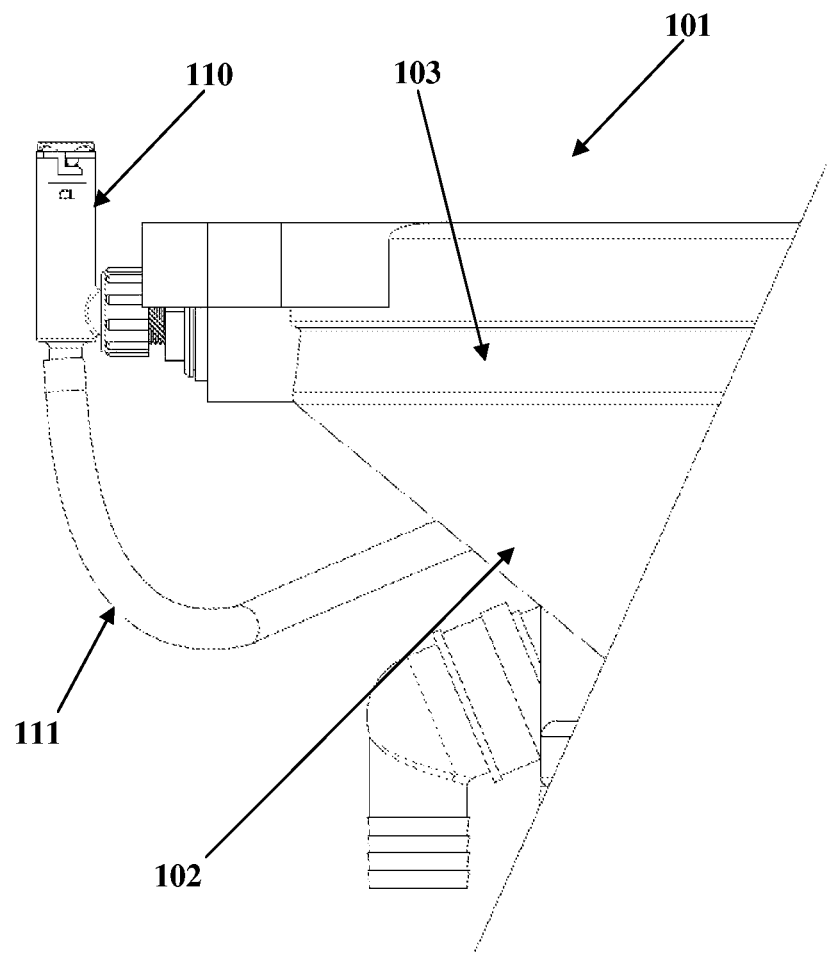
FIG. 7 exemplarily illustrates a side view of a portion of a toilet, showing a vacuum breaker positioned above a rim of a toilet bowl.

FIG. 7 exemplarily illustrates a side view of a portion of a toilet 101, showing the vacuum breaker 110 positioned above the rim 103 of the toilet bowl 102. The vacuum breaker 110 is in fluid communication with the outlet hose 111 and prevents a back flow of the pressurized fresh water 106 exemplarily illustrated in FIG. 1A, to the integral inlet valve assembly 123 from the rim 103 of the toilet bowl 102 via the outlet hose 111. When the check valve 129 of the integral inlet valve assembly 123 exemplarily illustrated in FIG. 3 is opened, the pressurized fresh water 106 flows through the check valve 129 and flows through the outlet port 109 and the outlet hose 111 to the vacuum breaker 110. The pressurized fresh water 106 is transferred to the rim 103 of the toilet bowl 102 after passing through the vacuum breaker 110.

Figure 8:
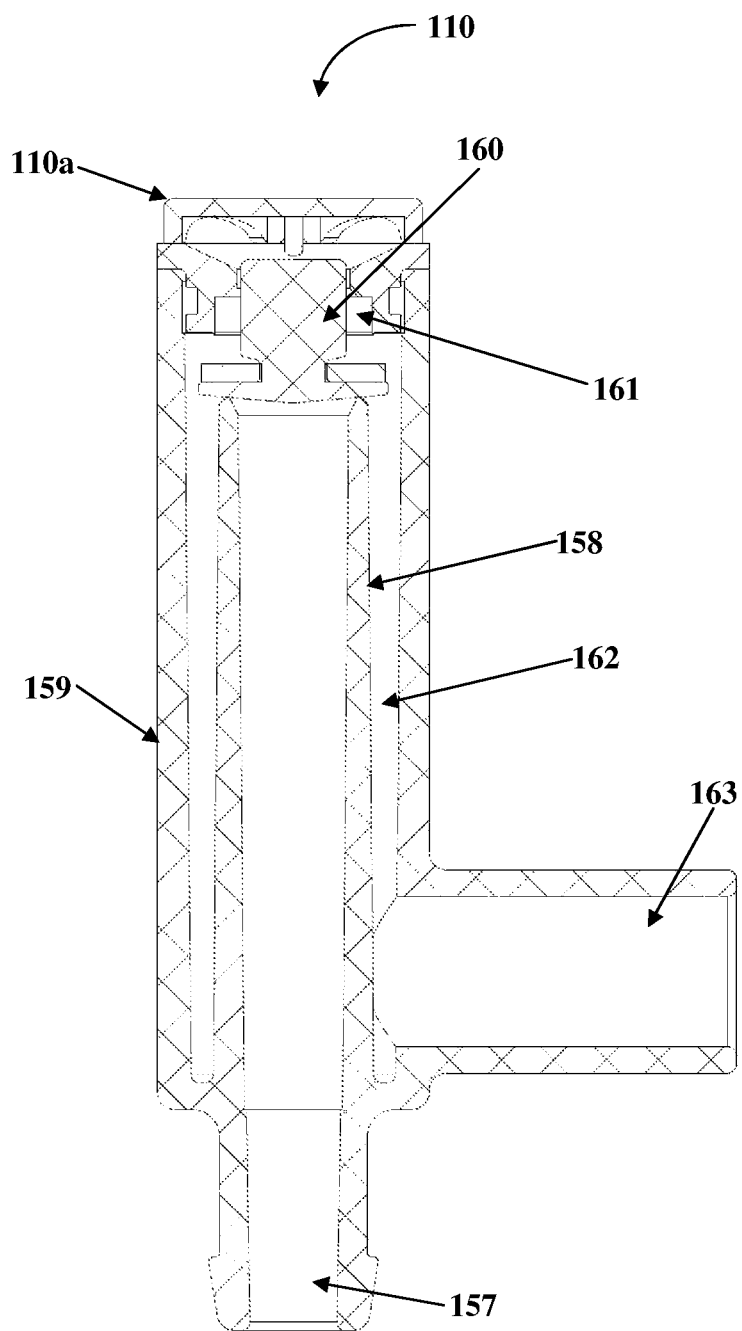
FIG. 8 exemplarily illustrates a sectional view of the vacuum breaker.

FIG. 8 exemplarily illustrates a sectional view of the vacuum breaker 110. When the pressurized fresh water 106 exemplarily illustrated in FIG. 1A, enters a lower opening 157 of the vacuum breaker 110, the pressurized fresh water 106 moves in an upward direction inside an inner tube 158 centrally positioned within a housing 159 of the vacuum breaker 110. A sealing plunger 160 is positioned proximal to an upper end 110a of the vacuum breaker 110 and is operably connected to the inner tube 158. The pressurized fresh water 106 flowing upward through the inner tube 158 forces the sealing plunger 160 in an upward direction to seal an opening 161 to the atmosphere positioned at the upper end 110a of the vacuum breaker 110. The sealing plunger 160 diverts the pressurized fresh water 106 in a downward direction around a breaker cavity 162 within the housing 159 of the vacuum breaker 110 and directs the flow of the pressurized fresh water 106 to an exit port 163 of the vacuum breaker 110 and to the rim 103 of the toilet bowl 102 exemplarily illustrated in FIG. 7. The pressurized fresh water 106 in the rim 103 of the toilet bowl 102 may be partially contaminated from the waste water 112 already present in the toilet bowl 102. When the pressurized fresh water 106 stops flowing, the sealing plunger 160 returns to its original position due to gravity and the opening 161 allows atmospheric air to enter the breaker cavity 162 thus breaking any vacuum and preventing a back flow of the pressurized fresh water 106 from the rim 103 of the toilet bowl 102 to the integral inlet valve assembly 123 via the outlet hose 111 exemplarily illustrated in FIG. 1A and FIG. 7.

Figure 9A:
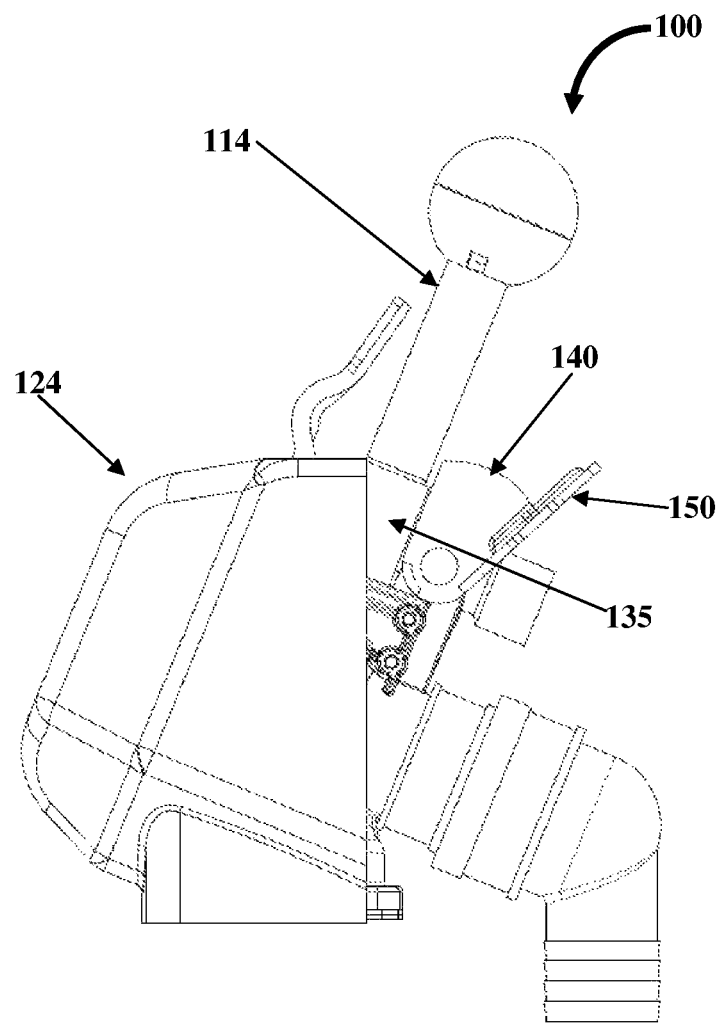
FIG. 9A exemplarily illustrates a side elevation view of the flushing apparatus, showing a retractable handle.
Figure 9B:
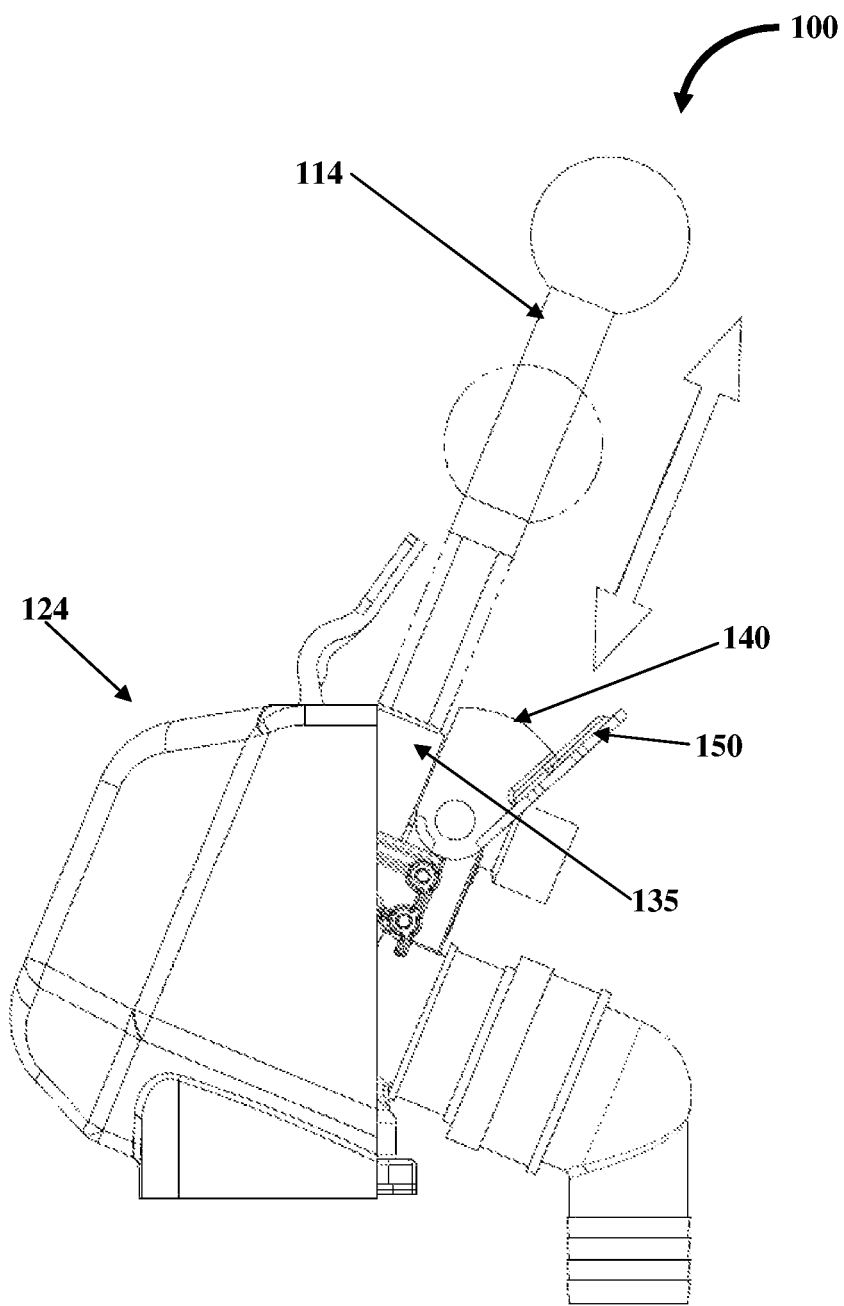
FIG. 9B exemplarily illustrates a side elevation view of the flushing apparatus, showing movement of the retractable handle in an upward direction and a downward direction.

FIGS. 9A-9B exemplarily illustrate a side elevation views of the flushing apparatus 100, showing the retractable handle 114. The retractable handle 114 is, for example, a telescopic handle. The retractable handle 114 is positioned within the sleeve 135 of the connecting rod 132 exemplarily illustrated in FIG. 4. When the retractable handle 114 is not in use, the retractable handle 114 is in a retracted position as exemplarily illustrated in FIG. 9A. The retractable handle 114 can further be extended upwards or can slide from within the sleeve 135 in a substantially vertical direction in an upward direction and a downward direction as indicated by the arrows in FIG. 9B. The movement of the retractable handle 114 in the upward direction and the downward direction provides an optimum leverage to a user to move the retractable handle 114 in a forward direction and a backward direction as disclosed in the detailed description of FIGS. 10A-10B and FIGS. 13B-13C. The user can also place the retractable handle 114 in a comfortable pumping position of choice. A locking cam 140 comprising the shut off lever 150 is positioned proximal to the retractable handle 114 and is used for locking the retractable handle 114 in position when the retractable handle 114 is moved in the forward direction as exemplarily illustrated in FIG. 10B.

FIGS. 10A-10B exemplarily illustrate sectional views of the flushing apparatus 100, showing movement of the retractable handle 114 and the piston 133 of the discharge pump assembly 124. A sectional view of the flushing apparatus 100, showing the elastomeric stopper 139 and the locking cam 140 in a resting position is exemplarily illustrated in FIG. 10B. When the retractable handle 114 is moved in a backward direction, the piston 133 moves in a backward direction to suction the waste water 112, exemplarily illustrated in FIG. 1A, into the pump cavity 134, and when the retractable handle 114 is moved in a forward direction, the piston 133 moves forward to direct the flow of the waste water 112 to the discharge port 113 as disclosed in the detailed description of FIGS. 13A-13C.

In an embodiment, the elastomeric stopper 139 of the discharge pump assembly 124 is attached to a rear surface 133a of the piston 133 of the discharge pump assembly 124. The elastomeric stopper 139 seals the discharge port 113 to prevent a back flow of the waste water 112 into the toilet bowl 102 via the waste water pipe 120 in fluid communication with the discharge port 113 exemplarily illustrated in FIG. 1B, after the piston 133 is completely pushed or moves to a forward position and locked in the forward position using the locking cam 140 as exemplarily illustrated in FIG. 10B. In an embodiment, the locking cam 140 is pivotally connected to an upper section 122a of the discharge pump body 122 of the discharge pump assembly 124. The locking cam 140 locks the retractable handle 114 when the piston 133 is completely pushed to the forward position by rotating and positioning the locking cam 140 below a lower end 114a of the retractable handle 114. The locking cam 140 is rotated and positioned below the lower end 114a of the retractable handle 114 by actuating the shut off lever 150 exemplarily illustrated in FIGS. 9A-9B.

Figures 11A, 11B:
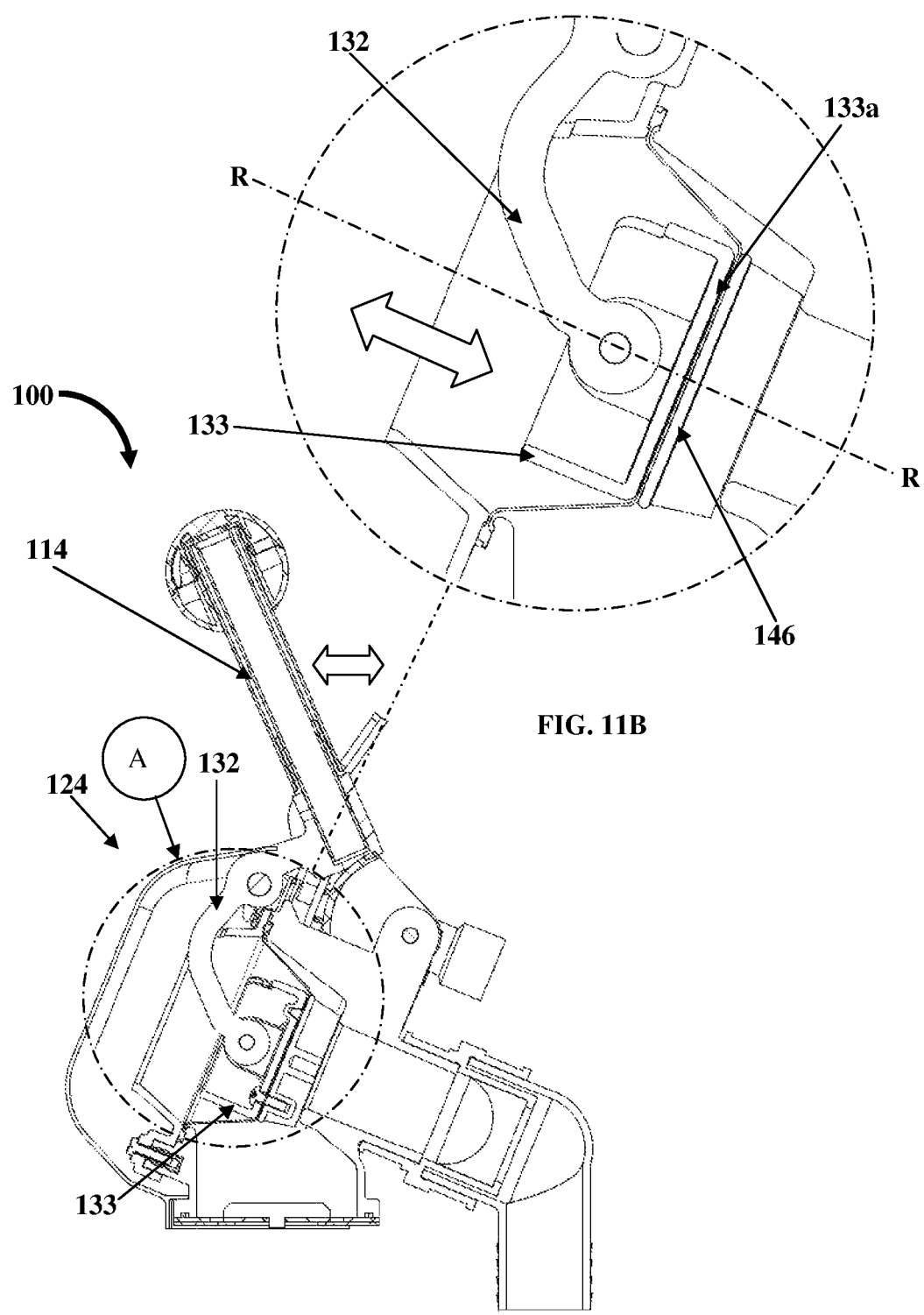
FIG. 11A exemplarily illustrates a cutaway view of the flushing apparatus, showing a generally cup shaped geometry of the piston of the discharge pump assembly, configured to maintain a consistent stroke for the circular diaphragm.
FIG. 11B exemplarily illustrates an enlarged view of a portion marked A in FIG. 11A, showing the generally cup shaped geometry of the piston.

FIG. 11A exemplarily illustrate a cutaway view of the flushing apparatus 100, showing a generally cup shaped geometry of the piston 133 of the discharge pump assembly 124, configured to maintain a consistent stroke for the circular diaphragm 146 exemplarily illustrated in FIG. 11B. In an embodiment, a predefined geometry of the piston 133 maintains a consistent stroke for the circular diaphragm 146. An enlarged view of a portion marked A in FIG. 11A, showing the generally cup shaped geometry of the piston 133 is exemplarily illustrated in FIG. 11B. When the retractable handle 114 is moved in a forward direction and a backward direction, the piston 133 in communication with the retractable handle 114 via the connecting rod 132 is actuated in a forward direction and backward direction, as indicated by the arrows in FIG. 11B. The circular diaphragm 146 connected on the rear surface 133a of the piston 133 is actuated in a forward direction and a backward direction along an axis of stroke RR of the circular diaphragm 146. Conventionally, when a piston having a non-specific geometry, for example, a round disc shaped piston is used, the circular diaphragm 146 may distort and misalign from the axis of stroke RR. In the flushing apparatus 100 disclosed herein, the predefined geometry defined, for example, by the cup shape of the piston 133 exemplarily illustrated in FIGS. 11A-11B, enables the circular diaphragm 146 connected on the rear surface 133a of the piston 133 to maintain a consistent alignment with the axis of stroke RR of the circular diaphragm 146.

Figure 12:
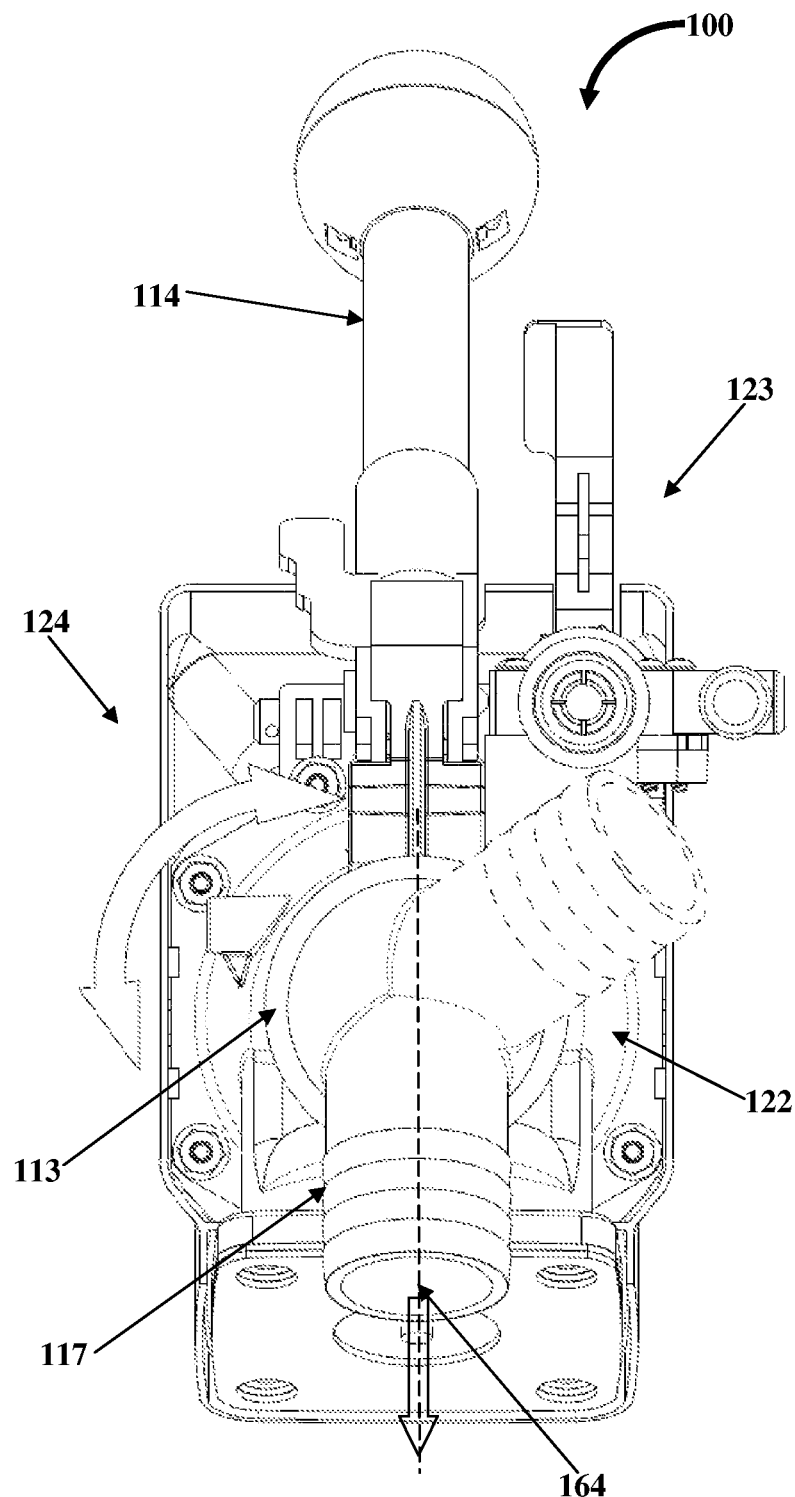
FIG. 12 exemplarily illustrates a bottom perspective view of the flushing apparatus, showing a discharge fitting positioned at different angles.

FIG. 12 exemplarily illustrates a bottom perspective view of the flushing apparatus 100, showing the discharge fitting 117 positioned at different angles. The discharge fitting 117 is removably connected to the discharge port 113 of the discharge pump assembly 124. The forward movement of the retractable handle 114 pushes the waste water 112 exemplarily illustrated in FIG. 1A, from the pump cavity 134 of the discharge pump body 122 to the discharge port 113 as exemplarily illustrated in FIG. 13C. The discharge fitting 117 transfers the waste water 112 from the discharge port 113 to the waste holding tank 115 via the discharge outlet pipe 116 as exemplarily illustrated in FIG. 1A. The discharge fitting 117 rotates, for example, about 360 degrees with respect to a vertical axis 164 of the discharge fitting 117 to connect to the discharge outlet pipe 116 at different angles.

Figure 13A:
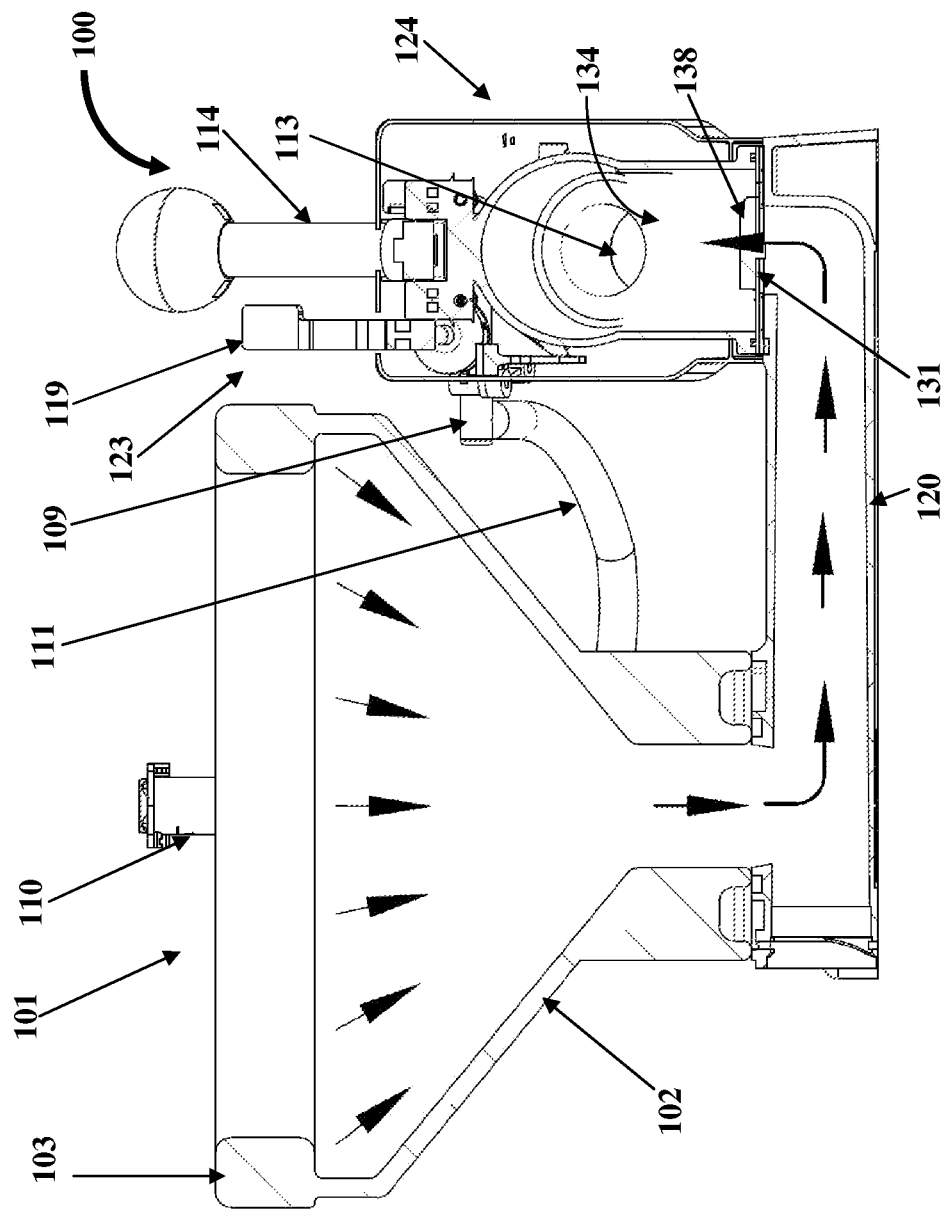
FIG. 13A exemplarily illustrates a partial sectional view of the flushing apparatus operably connected to a toilet, showing flow of waste water from the toilet bowl to a waste water inlet port of the discharge pump assembly through a waste water pipe.
Figure 13B:
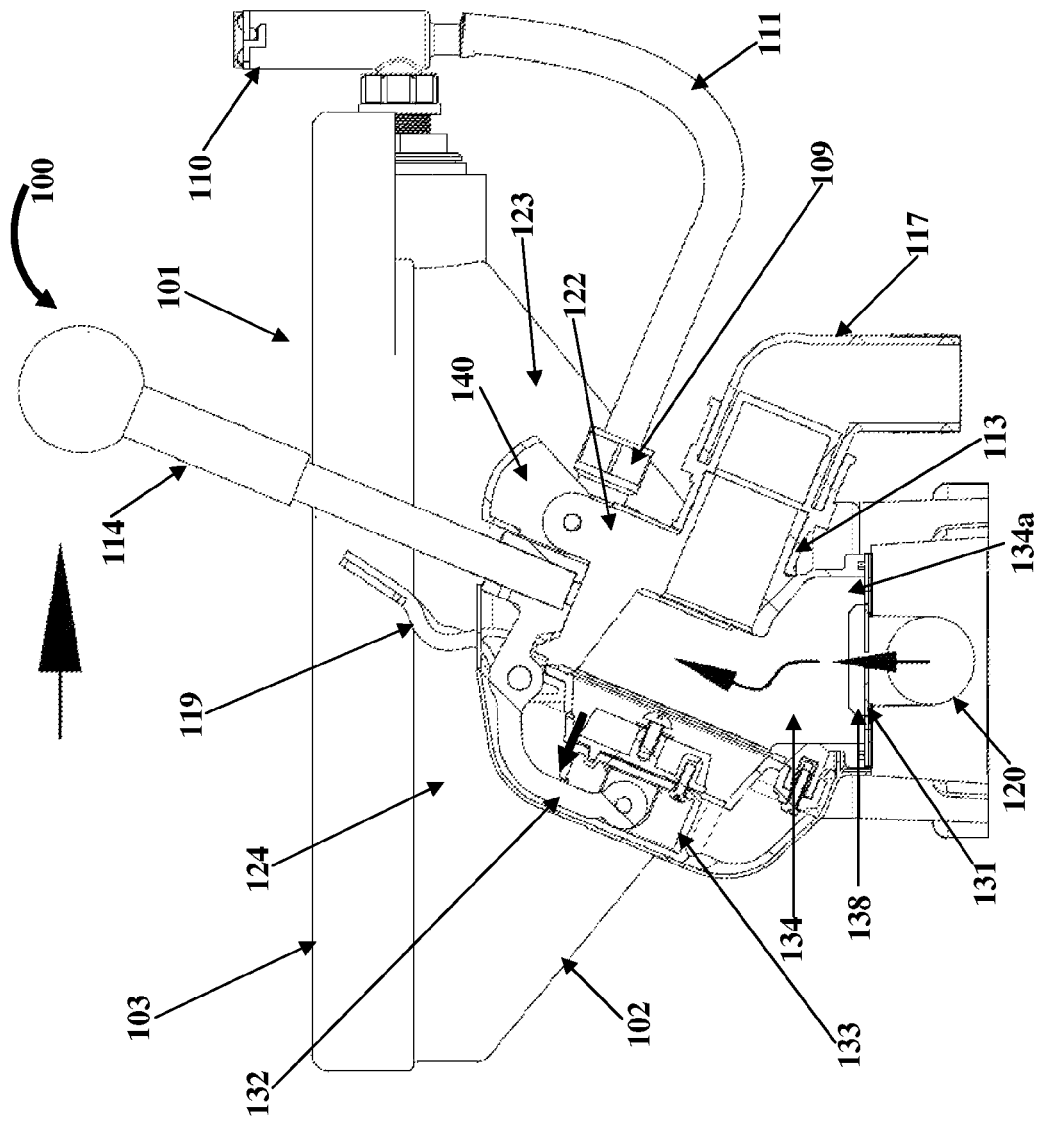
FIG. 13B exemplarily illustrates a partial sectional view of the flushing apparatus operably connected to the toilet, showing movement of the retractable handle in a backward direction for suctioning waste water into a pump cavity of the discharge pump body of the discharge pump assembly.
Figure 13C:
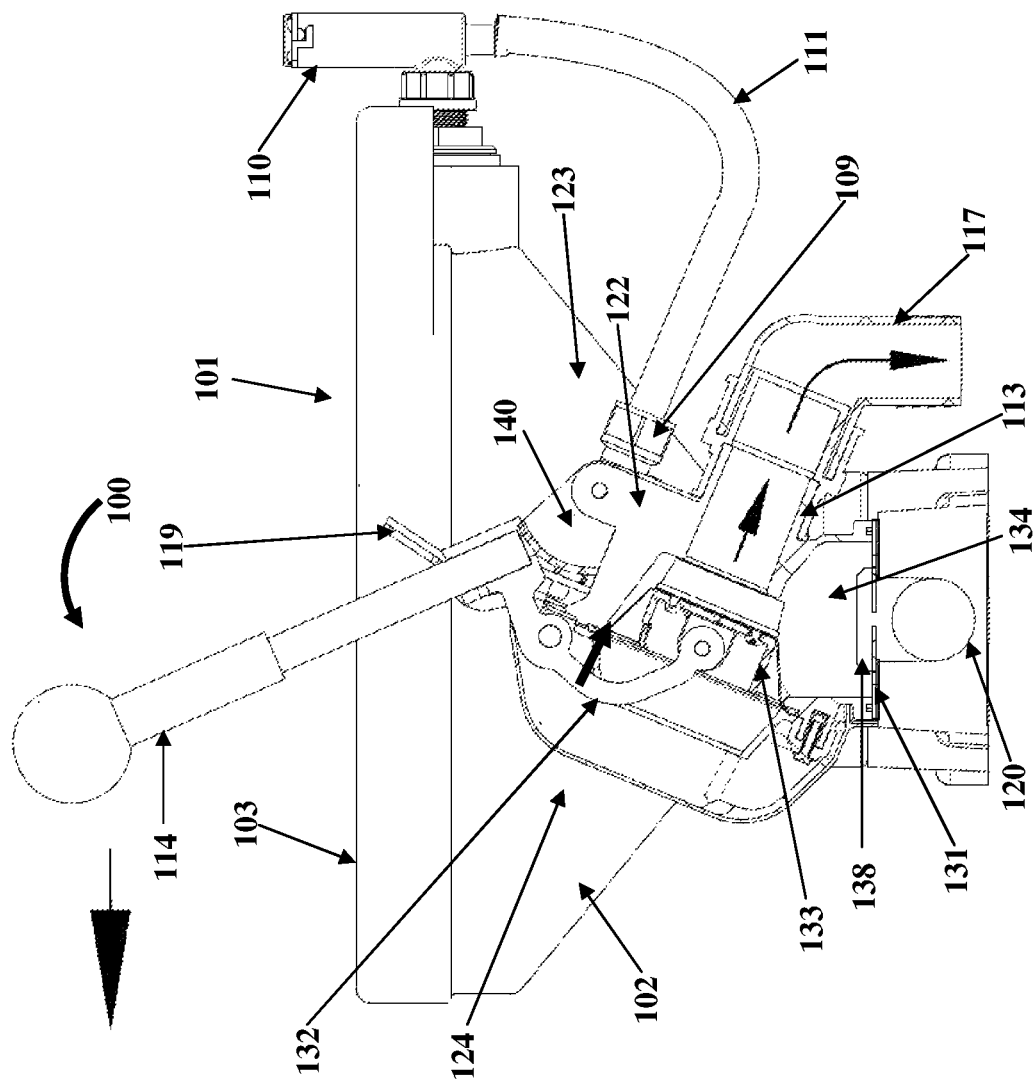
FIG. 13C exemplarily illustrates a partial sectional view of the flushing apparatus operably connected to the toilet, showing movement of the retractable handle in a forward direction for discharging waste water into a discharge port of the discharge pump assembly.

FIGS. 13A-13C exemplarily illustrate partial sectional views of the flushing apparatus 100 operably connected to a toilet 101. FIG. 13A shows the flow of waste water 112, exemplarily illustrated in FIG. 1A, from the toilet bowl 102 to the waste water inlet port 131 of the discharge pump assembly 124 through the waste water pipe 120. FIG. 13B shows movement of the retractable handle 114 in a backward direction for suctioning waste water 112 into the pump cavity 134 of the discharge pump body 122 of the discharge pump assembly 124. FIG. 13C shows movement of the retractable handle 114 in a forward direction for discharging the waste water 112 into the discharge port 113. When the flushing process is initiated, the check valve 129 of the integral inlet valve assembly 123, exemplarily illustrated in FIG. 3, is opened using the lever 119 to transfer pressurized fresh water 106 from the fresh water source 107 to the rim 103 of the toilet bowl 102 through the inlet hose member 108 and the pressurized fresh water inlet port 105, and then to the outlet port 109, the outlet hose 111, and the vacuum breaker 110 as exemplarily illustrated in FIGS. 1A-1B, FIG. 2, and FIG. 3.

The pressurized fresh water 106 is flushed from the rim 103 into the toilet bowl 102 and the waste water 112 in the toilet bowl 102 is transferred through the waste water pipe 120 to the waste water inlet port 131 of the discharge pump assembly 124 as exemplarily illustrated in FIG. 13A. When the retractable handle 114 is moved in the backward direction as exemplarily illustrated in FIG. 13B, the piston 133 in communication with the retractable handle 114 via the connecting rod 132 is pulled in a backward direction, as shown by the arrow in FIG. 13B, which causes the flapper valve member 138 positioned proximal to the lower section 134a of the pump cavity 134 of the discharge pump body 122 to open to suction the waste water 112 into the pump cavity 134. When the retractable handle 114 is moved in the forward direction as exemplarily illustrated in FIG. 13C, the piston 133 in communication with the retractable handle 114 via the connecting rod 132 is pushed in a forward direction, as shown by the arrow in FIG. 13C, to allow the discharge of the waste water 112 through the discharge port 113. The discharge fitting 117 is removably connected to the discharge port 113 to connect to a discharge outlet pipe 116 to transfer the waste water 112 to a waste holding tank 115 as exemplarily illustrated in FIG. 1A.

Figure 14:
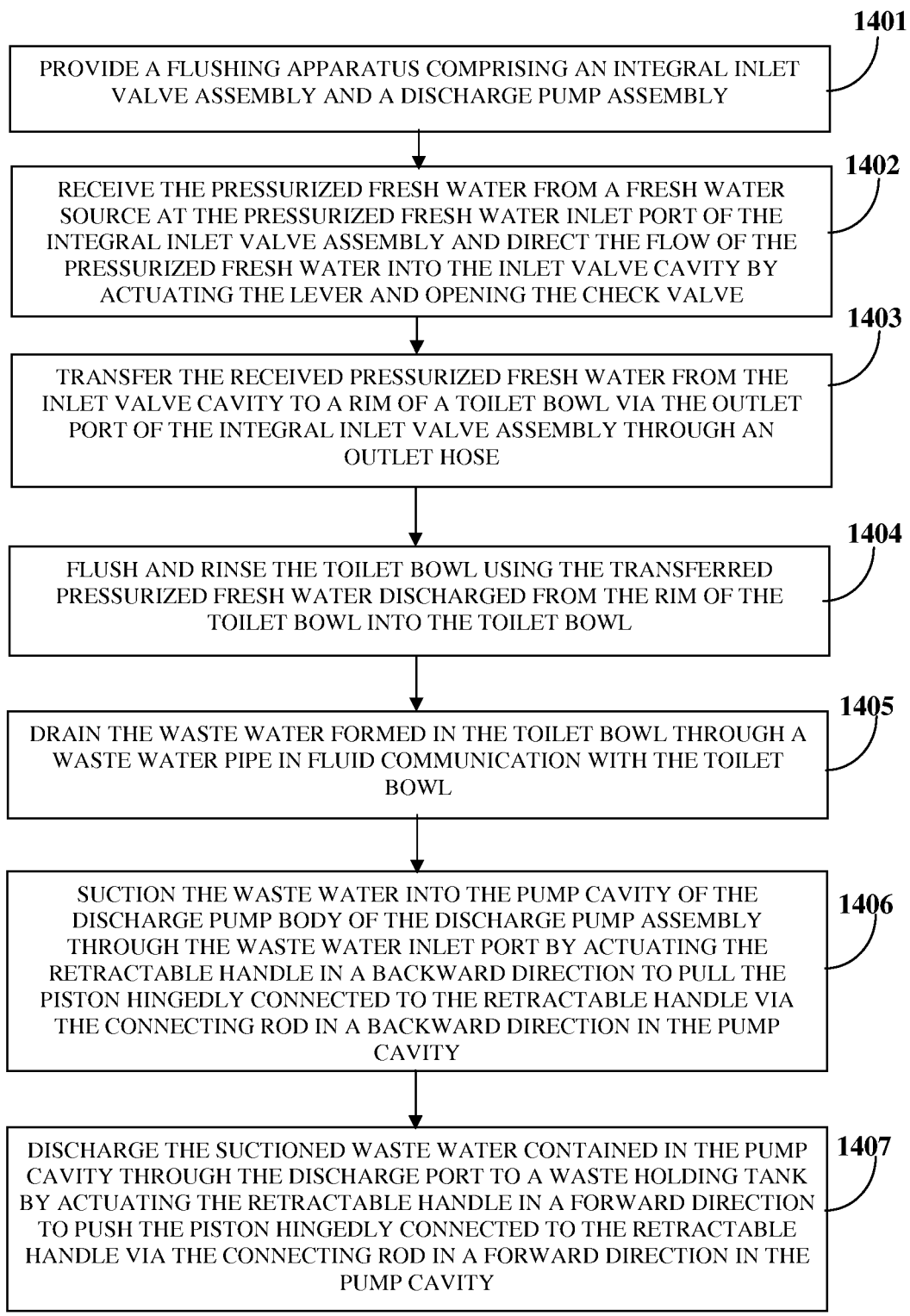
FIG. 14 illustrates a method for receiving pressurized fresh water and discharging waste water without contamination of the pressurized fresh water.

FIG. 14 illustrates a method for receiving pressurized fresh water 106 and discharging waste water 112 without contamination of the pressurized fresh water 106. The flushing apparatus 100 disclosed herein comprising the integral inlet valve assembly 123 and the operably isolated discharge pump assembly 124 as exemplarily illustrated in FIGS. 1A-1B and FIGS. 2-4 and as disclosed in the detailed description of FIGS. 1A-1B and FIGS. 2-4 is provided 1401. The integral inlet valve assembly 123 disclosed herein comprises the pressurized fresh water inlet port 105, the inlet valve body 121, the check valve 129, the lever 119, the first plunger 125, the second plunger 126, and the outlet port 109 as disclosed in the detailed description of FIGS. 2-3. The discharge pump assembly 124 disclosed herein comprises the waste water inlet port 131, the discharge pump body 122, the retractable handle 114, the connecting rod 132, the piston 133, and the discharge port 113 as disclosed in the detailed description of FIG. 4.

By actuating the lever 119 in communication with the first plunger 125 and the second plunger 126 of the integral inlet valve assembly 123, and opening the check valve 129 of the integral inlet valve assembly 123, pressurized fresh water 106 from a fresh water source 107 is received 1402 at the pressurized fresh water inlet port 105 of the integral inlet valve assembly 123 and the flow of the pressurized fresh water 106 is directed into the inlet valve cavity 127 of the inlet valve body 121. The outlet hose 111 transfers 1403 the received pressurized fresh water 106 from the inlet valve cavity 127 of the inlet valve body 121 to a rim 103 of a toilet bowl 102 via the outlet port 109 of the integral inlet valve assembly 123. The transferred pressurized fresh water 106 discharged from the rim 103 of the toilet bowl 102 into the toilet bowl 102 flushes and rinses 1404 the toilet bowl 102. The waste water pipe 120 in fluid communication with the toilet bowl 102 drains 1405 the waste water 112 formed in the toilet bowl 102 by transferring the waste water 112 from the toilet bowl 102 to the waste water inlet port 131 of the discharge pump assembly 124.

The waste water 112 is suctioned 1406 into the pump cavity 134 of the discharge pump body 122 of the discharge pump assembly 124 through the waste water inlet port 131 by actuation of the retractable handle 114 in a backward direction which pulls the piston 133 hingedly connected to the retractable handle 114 via the connecting rod 132 in a backward direction in the pump cavity 134. The discharge port 113 discharges 1407 the suctioned waste water 112 contained in the pump cavity 134 to a waste holding tank 115 by actuation of the retractable handle 114 in a forward direction which pushes the piston 133 hingedly connected to the retractable handle 114 via the connecting rod 132 in a forward direction in the pump cavity 134 containing the suctioned waste water 112. Since the integral inlet valve assembly 123 is independent and operably isolated from the discharge pump assembly 124, pressurized fresh water 106 can be received into the rim 103 of the toilet bowl 102 without contamination while the waste water 112 is discharged.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A flushing apparatus, comprising:
   an integral inlet valve assembly comprising:
      a pressurized fresh water inlet port configured to receive pressurized fresh water from a fresh water source;
      an inlet valve body fixedly connected to said pressurized fresh water inlet port, said inlet valve body comprising an inlet valve cavity in fluid communication with said pressurized fresh water inlet port, said inlet valve cavity configured to contain and transfer said pressurized fresh water from said fresh water source to a rim of a toilet bowl;
      a check valve positioned in said inlet valve cavity of said inlet valve body and proximal to said pressurized fresh water inlet port, said check valve configured to open and close to direct a flow of said pressurized fresh water from said pressurized fresh water inlet port into said inlet valve cavity;
      a lever positioned proximal to a distal end of said inlet valve cavity of said inlet valve body;
      a first plunger positioned in said inlet valve cavity of said inlet valve body and operably connected between said lever and a second plunger, said first plunger, in communication with said lever, configured to actuate said second plunger;
      said second plunger positioned in said inlet valve cavity of said inlet valve body and operably connected between said first plunger and said check valve, said second plunger, in communication with said first plunger, configured to actuate said check valve to open and close said check valve; and
      an outlet port extending from said inlet valve body and in fluid communication with said inlet valve cavity of said inlet valve body, said outlet port configured to direct said flow of said pressurized fresh water from said inlet valve cavity to said rim of said toilet bowl through an outlet hose removably connected to and in fluid communication with said outlet port; and
   a discharge pump assembly operably isolated from said integral inlet valve assembly to preclude waste water discharged from said toilet bowl via said discharge pump assembly from contaminating said pressurized fresh water transferred to said toilet bowl via said integral inlet valve assembly, said discharge pump assembly comprising:
      a waste water inlet port positioned at a lower section of a discharge pump body, said waste water inlet port configured to receive said waste water from said toilet bowl via a waste water pipe;
      said discharge pump body comprising a pump cavity in fluid communication with said waste water pipe via said waste water inlet port;
      a retractable handle positioned above said pump cavity of said discharge pump body;
      a connecting rod positioned within said pump cavity of said discharge pump body and hingedly connected between said retractable handle and a piston, said connecting rod, in communication with said retractable handle, configured to actuate said piston in a forward direction and a backward direction;
      said piston positioned within said pump cavity of said discharge pump body and operably connected to said connecting rod, wherein said piston actuated in said backward direction by said connecting rod is configured to suction said waste water into said pump cavity, and wherein said piston actuated in said forward direction by said connecting rod is configured to discharge said waste water through a discharge port; and
      said discharge port extending from said discharge pump body and in fluid communication with said pump cavity of said discharge pump body, said discharge port configured to discharge said waste water from said pump cavity to a waste holding tank.

2. The flushing apparatus of claim 1, wherein said integral inlet valve assembly and said discharge pump assembly are positioned in close proximity behind a cover member to facilitate ease of operation of said flushing apparatus and a clean installation of said flushing apparatus.

3. The flushing apparatus of claim 1, wherein said discharge pump body of said discharge pump assembly is oriented at a predefined inclination to a vertical axis for facilitating a flexible pumping action of said piston in communication with said retractable handle of said discharge pump assembly.

4. The flushing apparatus of claim 1, wherein said lever of said integral inlet valve assembly is configured to actuate said check valve of said integral inlet valve assembly to allow said pressurized fresh water to rinse said toilet bowl, wherein said actuation of said check valve by said lever for rinsing said toilet bowl is independent of said discharge of said waste water from said toilet bowl through said discharge pump assembly.

5. The flushing apparatus of claim 1, wherein said check valve of said integral inlet valve assembly is removably positioned within said inlet valve cavity of said integral inlet valve assembly to facilitate repair and maintenance of said integral inlet valve assembly.

6. The flushing apparatus of claim 1, wherein said piston within said discharge pump body of said discharge pump assembly is oriented at a predefined inclination to a vertical axis to be in line with said discharge port of said discharge pump assembly to prevent clogging of said pump cavity of said discharge pump body and said discharge port.

7. The flushing apparatus of claim 1, wherein said discharge pump assembly further comprises a piston cap operably connected proximal to a rear surface of said piston of said discharge pump assembly, wherein said piston cap is configured to secure a circular diaphragm to said piston.

8. The flushing apparatus of claim 7, wherein a predefined geometry of said piston is configured to maintain a consistent stroke for said circular diaphragm.

9. The flushing apparatus of claim 1, wherein said integral inlet valve assembly further comprises a filter screen fixedly attached to said pressurized fresh water inlet port of said integral inlet valve assembly, wherein said filter screen is configured to trap microparticulates from said pressurized fresh water.

10. The flushing apparatus of claim 1, wherein said integral inlet valve assembly further comprises a diaphragm member positioned between said first plunger and said second plunger of said integral inlet valve assembly and fixedly connected to opposing walls of said inlet valve cavity of said inlet valve body of said integral inlet valve assembly, wherein said diaphragm member is configured to isolate said first plunger from said second plunger.

11. The flushing apparatus of claim 1, further comprising a vacuum breaker positioned above said rim of said toilet bowl, wherein said vacuum breaker is in fluid communication with said outlet hose and is configured to prevent a back flow of said pressurized fresh water to said integral inlet valve assembly from said rim of said toilet bowl via said outlet hose.

12. The flushing apparatus of claim 1, wherein said retractable handle of said discharge pump assembly is secured within a sleeve of said connecting rod of said discharge pump assembly, wherein said retractable handle is configured to retract in a substantially vertical direction within said sleeve in an upward direction and a downward direction.

13. The flushing apparatus of claim 12, wherein said sleeve of said connecting rod is configured as an integral socket to receive said retractable handle.

14. The flushing apparatus of claim 1, wherein said discharge pump assembly further comprises a flapper valve member positioned proximal to said lower section of said pump cavity of said discharge pump body of said discharge pump assembly and secured to said waste water inlet port via a thread member, wherein said flapper valve member is configured to open during movement of said piston in said backward direction to transfer said waste water from said lower section of said pump cavity to an upper section of said pump cavity via said waste water inlet port, and close during movement of said piston in said forward direction to discharge said waste water contained in said upper section of said pump cavity through said discharge port.

15. The flushing apparatus of claim 14, wherein said flapper valve member is further configured to prevent a back flow of said waste water to said toilet bowl via said waste water pipe in fluid communication with said pump cavity of said discharge pump body by closing said waste water inlet port.

16. The flushing apparatus of claim 1, wherein said discharge pump assembly further comprises an elastomeric stopper attached to a rear surface of said piston of said discharge pump assembly, wherein said elastomeric stopper is configured to seal said discharge port of said discharge pump assembly to prevent a back flow of said waste water into said toilet bowl via said waste water pipe in fluid communication with said discharge port after said piston of said discharge pump assembly is completely pushed to a forward position and locked in said forward position using a locking cam.

17. The flushing apparatus of claim 16, wherein said locking cam is pivotally connected to an upper section of said discharge pump body of said discharge pump assembly, wherein said locking cam is configured to lock said retractable handle when said piston is completely pushed to said forward position, by rotating and positioning said locking cam below a lower end of said retractable handle.

18. The flushing apparatus of claim 1, wherein said discharge pump assembly further comprises a discharge fitting removably connected to said discharge port of said discharge pump assembly, wherein said discharge fitting is configured to transfer said waste water from said discharge port to said waste holding tank via a discharge outlet pipe.

19. The flushing apparatus of claim 18, wherein said discharge fitting is further configured to rotate 360 degrees with respect to a vertical axis of said discharge fitting to connect to said discharge outlet pipe at a plurality of angles.

20. A method for receiving pressurized fresh water and discharging waste water without contamination of said pressurized fresh water, said method comprising:
providing a flushing apparatus comprising:
an integral inlet valve assembly comprising:
a pressurized fresh water inlet port;
an inlet valve body fixedly connected to said pressurized fresh water inlet port, said inlet valve body comprising an inlet valve cavity in fluid communication with said pressurized fresh water inlet port;
a check valve positioned in said inlet valve cavity of said inlet valve body and proximal to said pressurized fresh water inlet port;
a lever positioned proximal to a distal end of said inlet valve cavity of said inlet valve body, said lever operably connected to said check valve via a first plunger and a second plunger;
said first plunger positioned in said inlet valve cavity of said inlet valve body and operably connected between said lever and said second plunger;
said second plunger positioned in said inlet valve cavity of said inlet valve body and operably connected between said first plunger and said check valve; and
an outlet port extending from said inlet valve body and in fluid communication with said inlet valve cavity of said inlet valve body; and
a discharge pump assembly operably isolated from said integral inlet valve assembly to preclude said waste water discharged from a toilet bowl via said discharge pump assembly from contaminating said pressurized fresh water transferred to said toilet bowl via said integral inlet valve assembly, said discharge pump assembly comprising:
a waste water inlet port positioned at a lower section of a discharge pump body;
said discharge pump body comprising a pump cavity in fluid communication with a waste water pipe via said waste water inlet port, wherein said discharge pump body is positioned proximal to said integral inlet valve assembly at a predefined inclination to a vertical axis, wherein said predefined inclination of said discharge pump body is configured to facilitate a flexible pumping action of a piston in communication with a retractable handle of said discharge pump assembly;
said retractable handle positioned above said pump cavity of said discharge pump body, said retractable handle secured within a sleeve of a connecting rod of said discharge pump assembly, wherein said sleeve of said connecting rod is configured as an integral socket to receive said retractable handle;
said connecting rod positioned within said pump cavity of said discharge pump body and hingedly connected between said retractable handle and said piston;
said piston positioned within said pump cavity of said discharge pump body and operably connected to said connecting rod; and
a discharge port extending from said discharge pump body and in fluid communication with said pump cavity of said discharge pump body;
receiving said pressurized fresh water from a fresh water source at said pressurized fresh water inlet port of said integral inlet valve assembly and directing flow of said pressurized fresh water into said inlet valve cavity of said inlet valve body by actuating said lever, in communication with said first plunger and said second plunger of said integral inlet valve assembly, and opening said check valve of said integral inlet valve assembly;

transferring said received pressurized fresh water from said inlet valve cavity of said inlet valve body to a rim of said toilet bowl via said outlet port of said integral inlet valve assembly and through an outlet hose removably connected to and in fluid communication with said outlet port;

flushing and rinsing said toilet bowl using said transferred pressurized fresh water discharged from said rim of said toilet bowl into said toilet bowl;

draining said waste water formed in said toilet bowl through said waste water pipe in fluid communication with said toilet bowl;

suctioning said waste water into said pump cavity of said discharge pump body of said discharge pump assembly through said waste water inlet port by actuating said retractable handle in a backward direction to pull said piston hingedly connected to said retractable handle via said connecting rod in a backward direction in said pump cavity; and discharging said suctioned waste water contained in said pump cavity of said discharge pump body through said discharge port to a waste holding tank by actuating said retractable handle in a forward direction to push said piston hingedly connected to said retractable handle via said connecting rod in a forward direction in said pump cavity containing said suctioned waste water.

21. The method of claim 20, further comprising preventing a back flow of said pressurized fresh water to said integral inlet valve assembly from said rim of said toilet bowl via said outlet hose, by a vacuum breaker positioned above said rim of said toilet bowl, wherein said vacuum breaker is in fluid communication with said outlet hose.

22. The method of claim 20, wherein said retractable handle of said discharge pump assembly is configured to retract in a substantially vertical direction within said sleeve of said connecting rod of said discharge pump assembly in an upward direction and a downward direction.

23. The method of claim 20, further comprising preventing a back flow of said waste water to said toilet bowl via said waste water pipe in fluid communication with said pump cavity of said discharge pump body of said discharge pump assembly via said waste water inlet port of said discharge pump assembly, using a flapper valve member to close said waste water inlet port, wherein said flapper valve member is positioned proximal to said lower section of said pump cavity and secured to said waste water inlet port via a thread member.

24. The method of claim 20, further comprising preventing a back flow of said waste water from said discharge outlet pipe via said discharge port of said discharge pump assembly into said pump cavity of said discharge pump body of said discharge pump assembly using a discharge check valve coupling removably connected to said discharge port and a discharge fitting, when said retractable handle of said discharge pump assembly is actuated in said backward direction to pull said piston of said discharge pump assembly in said backward direction in said pump cavity and suction said waste water into said pump cavity via said waste water inlet port of said discharge pump assembly.

25. The method of claim 20, further comprising allowing said waste water to exit said pump cavity of said discharge pump body of said discharge pump assembly via said discharge port of said discharge pump assembly using a discharge check valve coupling removably connected to said discharge port and a discharge fitting, when said retractable handle is actuated in said forward direction to push said piston of said discharge pump assembly in said forward direction in said pump cavity and discharge said waste water through said discharge port to said waste holding tank.

26. The method of claim 20, further comprising preventing a back flow of said waste water into said toilet bowl via said waste water pipe in fluid communication with said discharge port of said discharge pump assembly, using an elastomeric stopper attached to a rear surface of said piston of said discharge pump assembly to seal said discharge port, after said piston of said discharge pump assembly is completely pushed to a forward position and locked in said forward position using a locking cam, wherein said locking cam is pivotally connected to an upper section of said discharge pump body of said discharge pump assembly, and wherein said locking cam is configured to lock said retractable handle when said piston is completely pushed to said forward position by rotating and positioning said locking cam.

27. The method of claim 20, further comprising transferring said waste water from said discharge port to a waste holding tank via a discharge outlet pipe using a discharge fitting removably connected to said discharge port of said discharge pump assembly, wherein said discharge fitting is configured to rotate 360 degrees with respect to a vertical axis of said discharge fitting to connect to said discharge outlet pipe at a plurality of angles.

* * * * *